United States Patent
Onozaki

(10) Patent No.: US 9,726,865 B2
(45) Date of Patent: Aug. 8, 2017

(54) ZOOM LENS SYSTEM

(71) Applicant: RICOH IMAGING COMPANY, LTD., Tokyo (JP)

(72) Inventor: Tatsuyuki Onozaki, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 82 days.

(21) Appl. No.: 14/944,572

(22) Filed: Nov. 18, 2015

(65) Prior Publication Data

US 2016/0147047 A1    May 26, 2016

(30) Foreign Application Priority Data

Nov. 26, 2014    (JP) ................................ 2014-238527

(51) Int. Cl.
- *G02B 15/16* (2006.01)
- *G02B 27/00* (2006.01)
- *G02B 15/173* (2006.01)

(52) U.S. Cl.
CPC ........... *G02B 15/16* (2013.01); *G02B 15/173* (2013.01); *G02B 27/0025* (2013.01)

(58) Field of Classification Search
CPC ......... G02B 9/60–9/64; G02B 13/0045; G02B 15/10–15/177
USPC .......................................... 359/763–764, 766
See application file for complete search history.

(56) References Cited

U.S. PATENT DOCUMENTS

| | | |
|---|---|---|
| 6,483,648 B1 | 11/2002 | Yamanashi |
| 8,792,181 B2 * | 7/2014 | Nanba .................. G02B 15/173 359/676 |
| 2003/0151828 A1 | 8/2003 | Ozaki |
| 2009/0207501 A1 | 8/2009 | Yokoyama |
| 2011/0149412 A1 | 6/2011 | Sato |
| 2013/0169846 A1 | 7/2013 | Yanai et al. |
| 2013/0242408 A1 * | 9/2013 | Nanba .................. G02B 13/001 359/683 |

(Continued)

FOREIGN PATENT DOCUMENTS

| | | |
|---|---|---|
| JP | 7-5362 | 1/1995 |
| JP | 8-179213 | 7/1996 |

(Continued)

*Primary Examiner* — Bumsuk Won
*Assistant Examiner* — Jeffrey Madonna
(74) *Attorney, Agent, or Firm* — Greenblum & Bernstein, P.L.C.

(57) ABSTRACT

A zoom lens system includes a positive first lens group, a negative second lens group, a positive third lens group, a negative fourth lens group, and a positive fifth lens group having a plurality of lens elements. During zooming from the short to long focal length extremities, at least the first, third and fifth lens groups move in an optical axis direction. A surface closest to the image side of the zoom lens system is a concave surface facing the image side. The following condition (1) is satisfied:

$$0.52 < (m345t/m345w)/(ft/fw) < 0.70 \quad (1),$$

wherein m345w and m345t designate, at the short and long focal length extremities, respectively, the combined lateral magnification of the third, fourth and fifth lens groups when focused on an object at infinity; and fw and ft designate the focal length of the zoom lens system at the short and long focal length extremities, respectively.

13 Claims, 23 Drawing Sheets

(56) References Cited

U.S. PATENT DOCUMENTS

2013/0250435 A1\* 9/2013 Hagiwara ............ G02B 15/173
359/684
2014/0043692 A1\* 2/2014 Mogi ..................... G02B 15/14
359/683

FOREIGN PATENT DOCUMENTS

| JP | 2001-83420 | 3/2001 |
|----|------------|--------|
| JP | 2003-66334 | 3/2003 |
| JP | 2003-202499 | 7/2003 |
| JP | 2009-198552 | 9/2009 |
| JP | 2010-44190 | 2/2010 |
| JP | 2011-8234 | 1/2011 |
| JP | 2013-137464 | 7/2013 |

\* cited by examiner

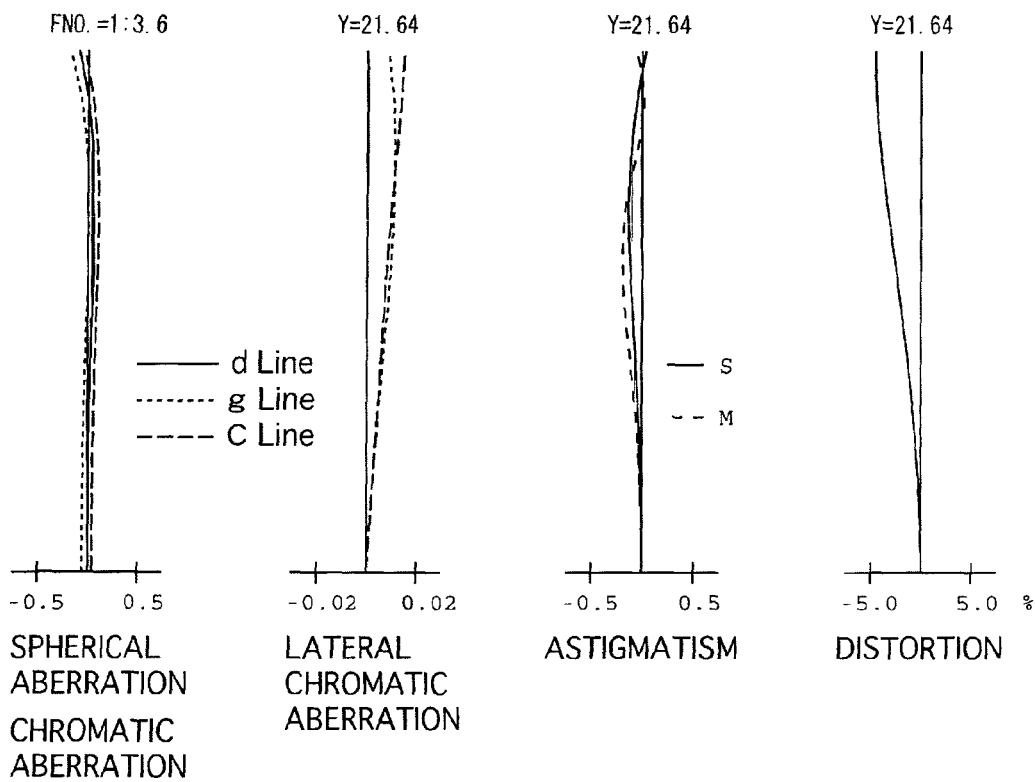
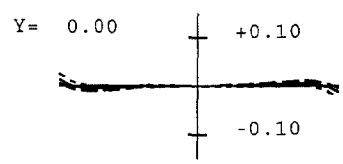
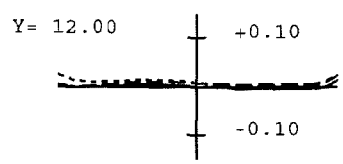
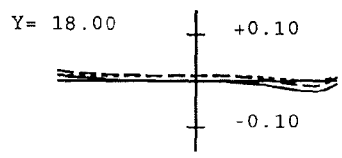
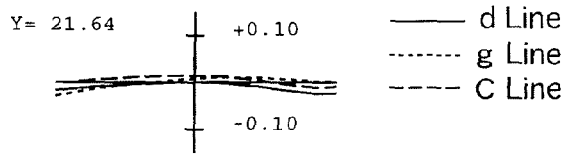

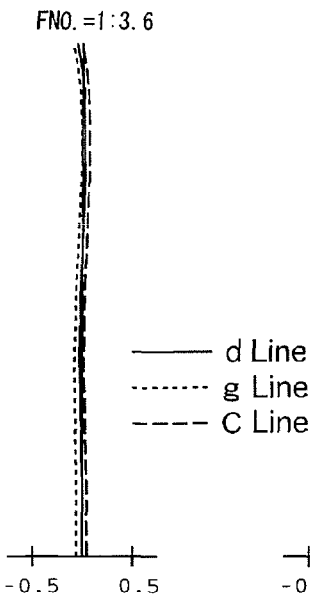
Fig. 8A
FNO.=1:3.6
— d Line
······ g Line
---- C Line
-0.5  0.5
SPHERICAL
ABERRATION
CHROMATIC
ABERRATION
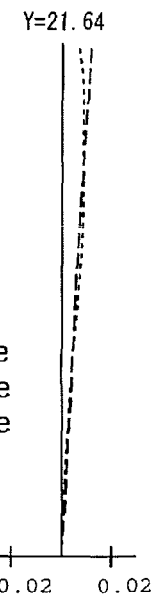
Fig. 8B
Y=21.64
-0.02  0.02
LATERAL
CHROMATIC
ABERRATION
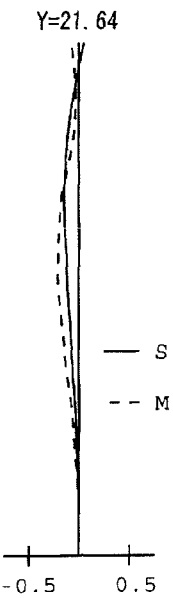
Fig. 8C
Y=21.64
— S
-- M
-0.5  0.5
ASTIGMATISM
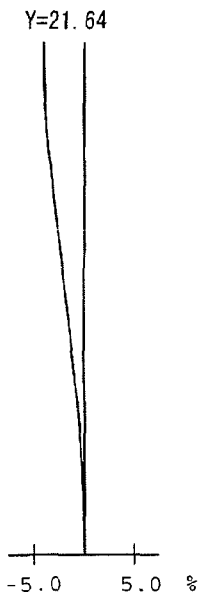
Fig. 8D
Y=21.64
-5.0  5.0 %
DISTORTION
Fig. 9A
Y= 0.00    +0.10
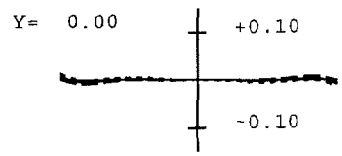
           -0.10
Fig. 9B
Y= 12.00   +0.10
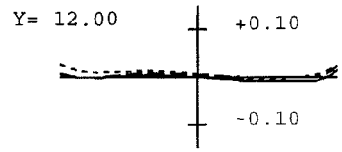
           -0.10
Fig. 9C
Y= 18.00   +0.10
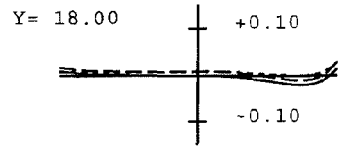
           -0.10
Fig. 9D
Y= 21.64   +0.10
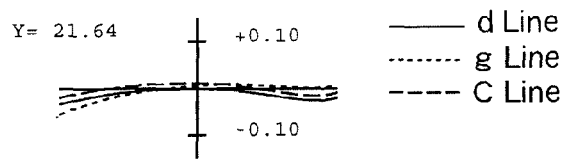
           -0.10
— d Line
······ g Line
---- C Line

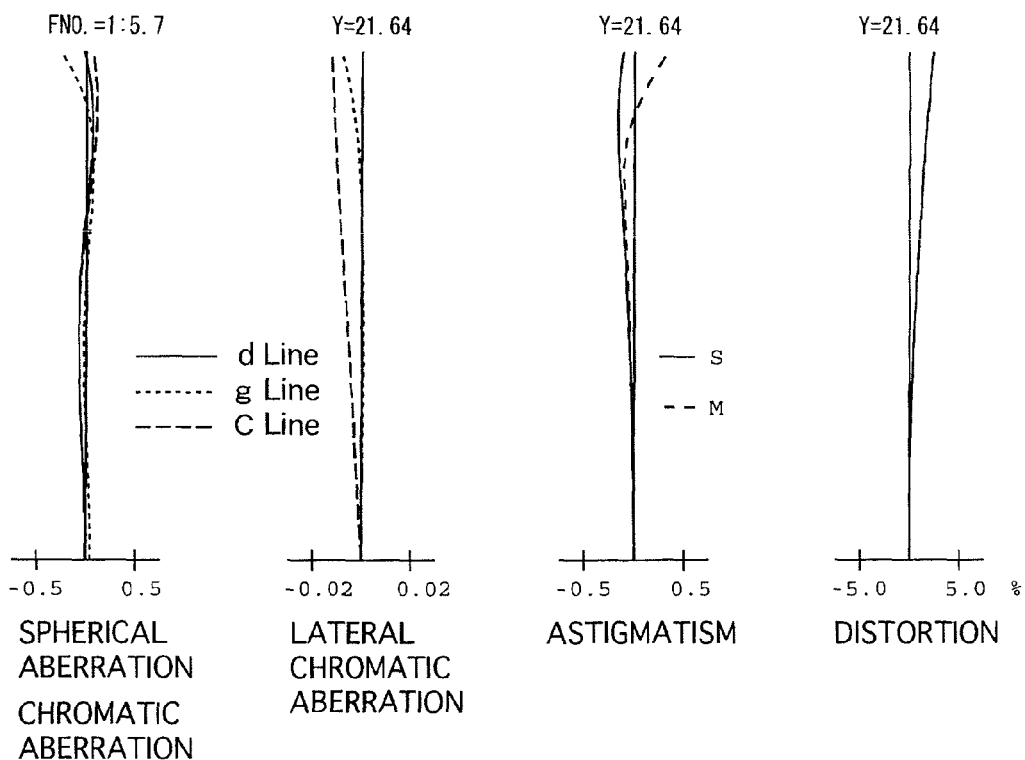
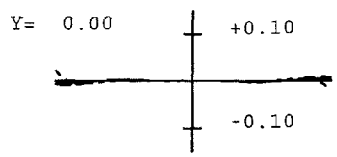
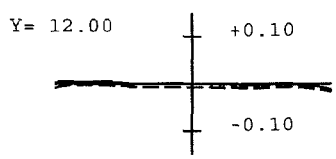
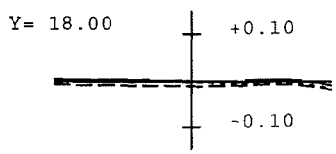
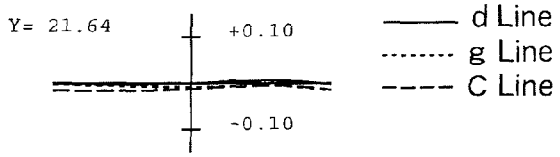

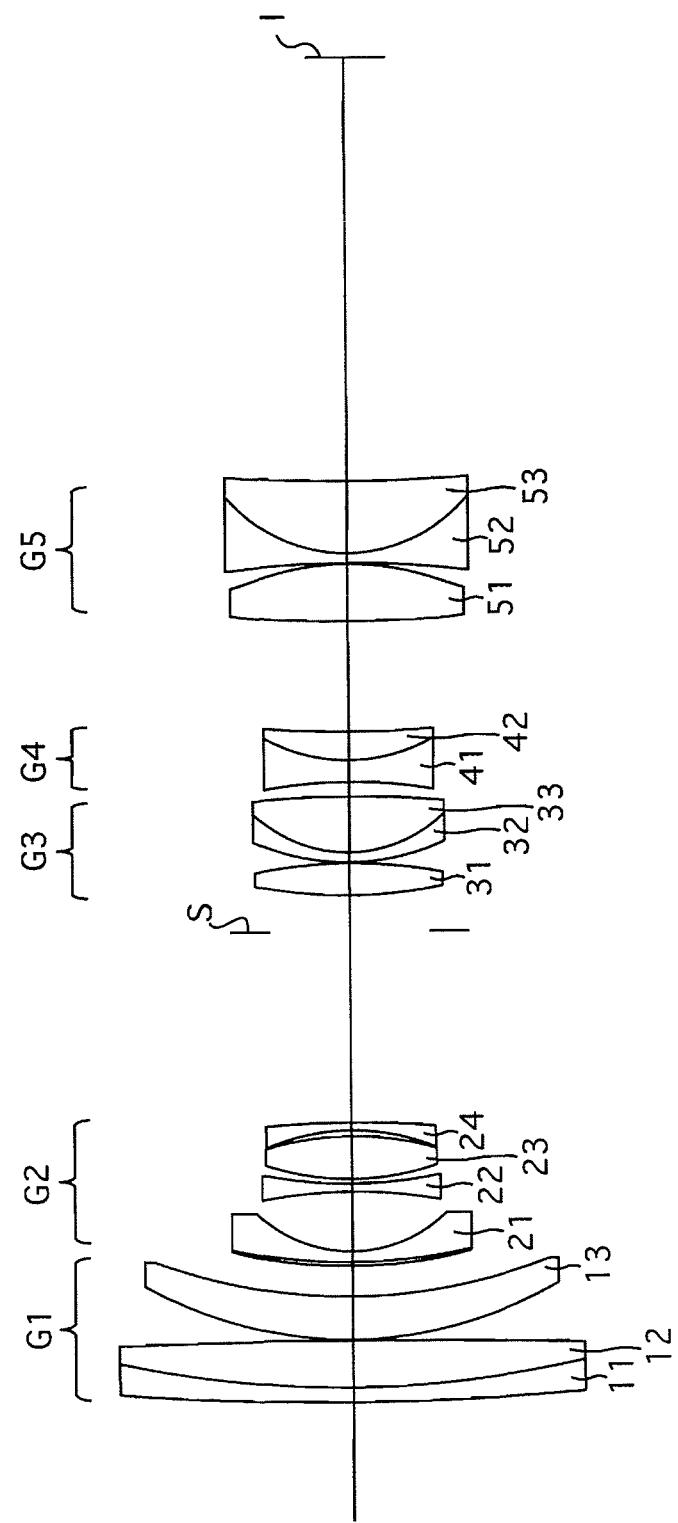

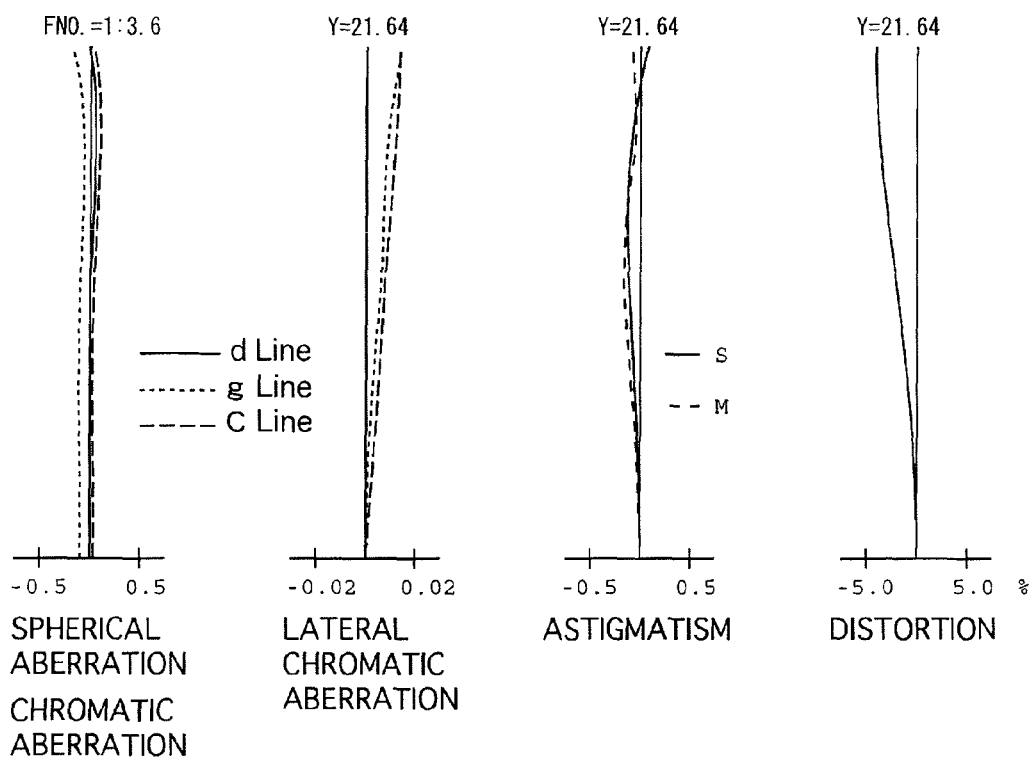
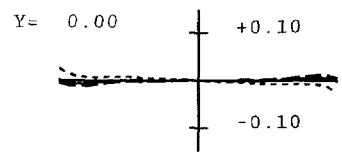
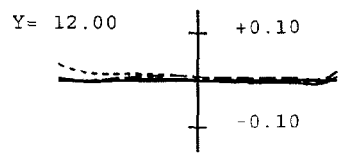
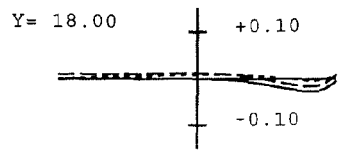
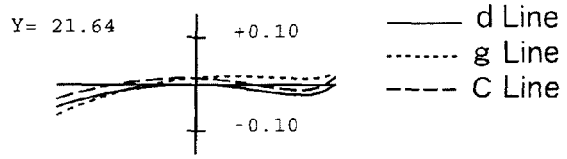

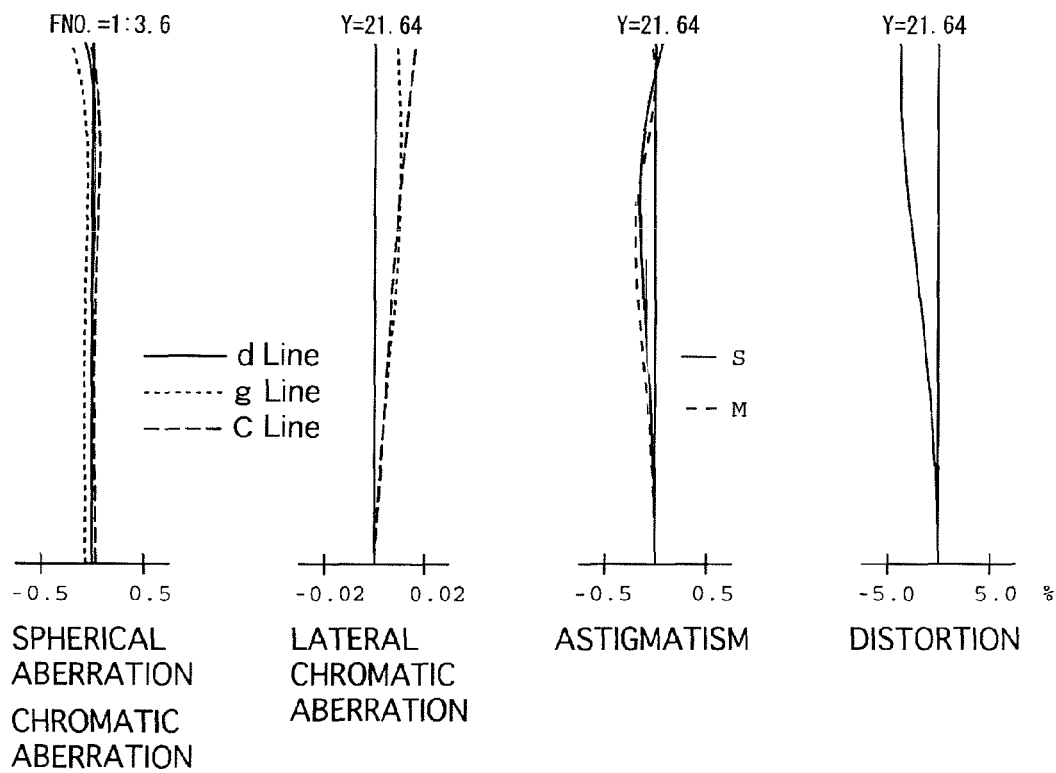

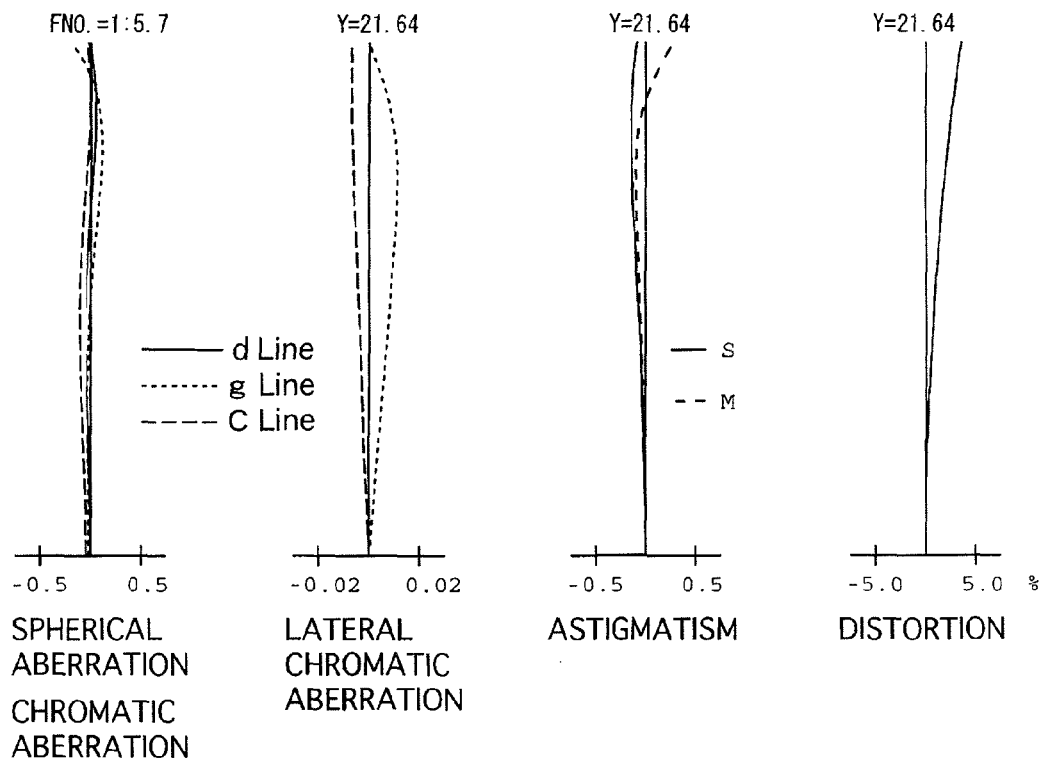
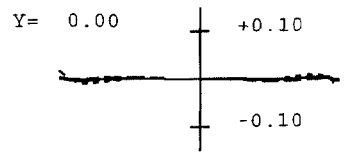
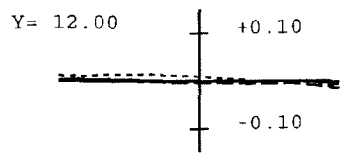
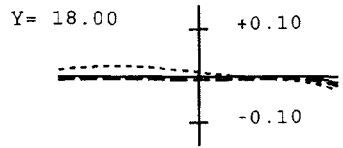
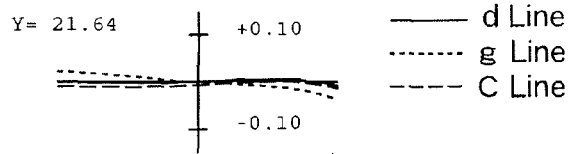

SPHERICAL ABERRATION CHROMATIC ABERRATION | LATERAL CHROMATIC ABERRATION | ASTIGMATISM | DISTORTION

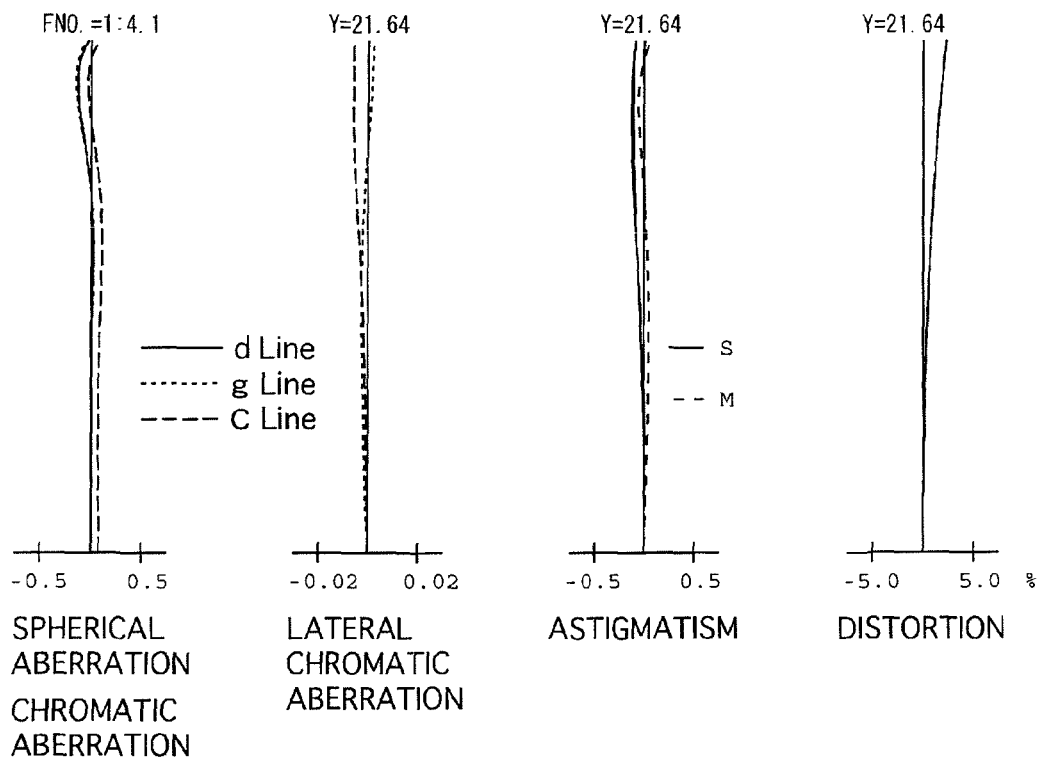

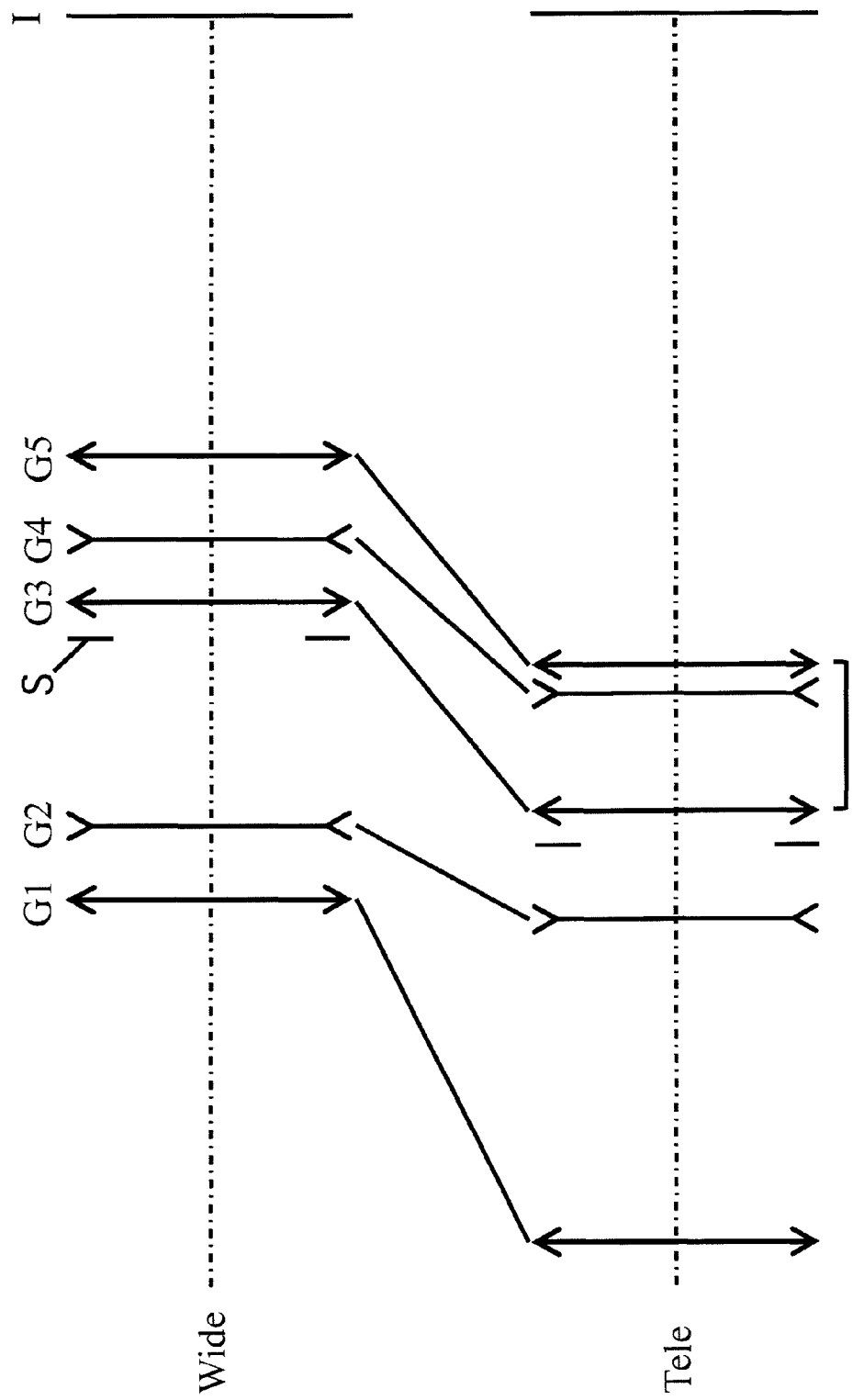

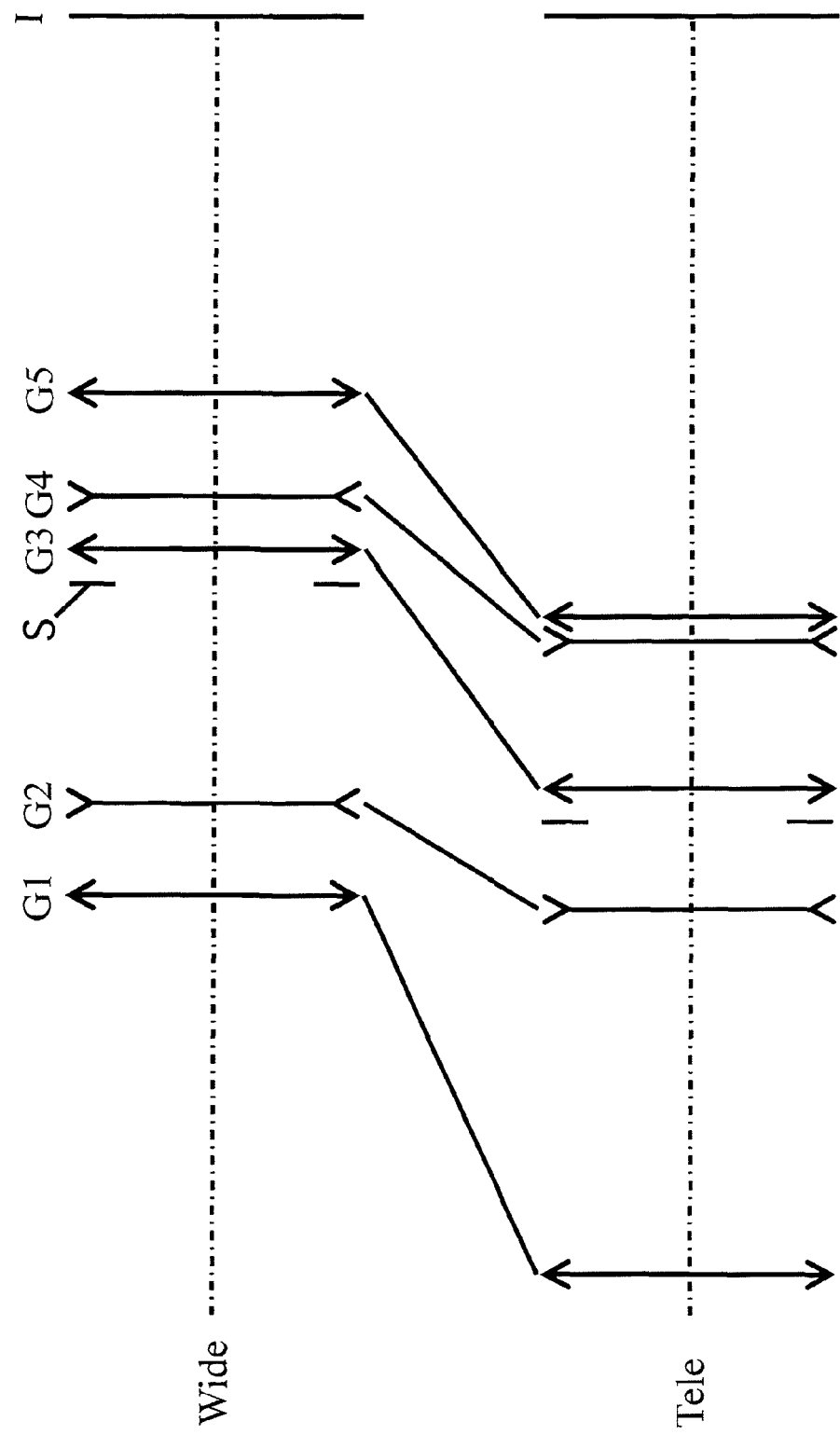

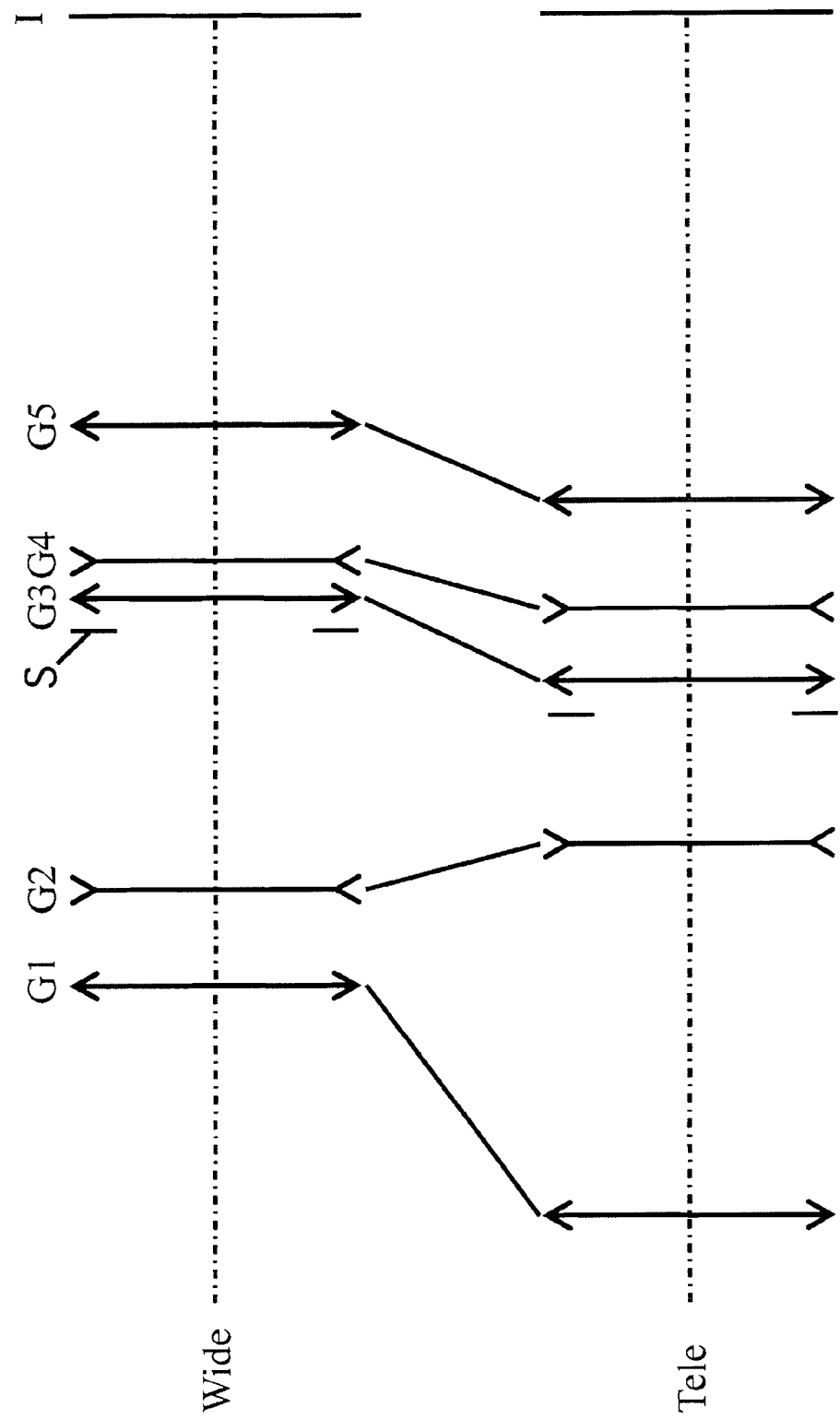

ZOOM LENS SYSTEM

BACKGROUND OF THE INVENTION

1. Field of the Invention

The present invention relates to a zoom lens system, and in particular, relates to a zoom lens system that is favorable for use in a single-lens reflex camera.

2. Description of Related Art

Various zoom lens systems that are suitable for electronic still cameras have been proposed in the related art. For example, in each of Patent Literature Nos. 1 through 3, a positive-lead zoom lens system configured of a positive lens group, a negative lens group, a positive lens group, a negative lens group and a positive lens group, in that order from the object side (five lens groups) is disclosed.

In such positive-lead zoom lens systems, the overall length of the zoom lens system can be made shorter at the wide-angle extremity (short focal length extremity) compared to that of a negative-lead zoom lens system. Furthermore, since a zoom lens system configured of five lens groups has additional freedom in regard to the movement of the lens groups thereof compared to that of a zoom lens system configured of four lens groups, fluctuation in aberrations that occur during zooming can be suppressed.

On the other hand, in recent zoom lens systems for use in a digital single-lens reflex camera, a high optical quality is demanded over the entire focal length range (zooming range).

Generally, in a zoom lens system, when the refractive power of a lens group that takes the major burden of the zooming operation is increased, a high zoom ratio can be achieved with a predetermined movement amount of such a lens group; however, fluctuations in aberrations increase during zooming, making it difficult to achieve a favorable optical quality over the entire focal length range (zooming range).

PATENT LITERATURE

[Patent Literature 1] Japanese Unexamined Patent Publication No. H08-179213
[Patent Literature 2] Japanese Unexamined Patent Publication No. 2001-83420
[Patent Literature 3] Japanese Unexamined Patent Publication No. 2003-66334

SUMMARY OF THE INVENTION

In each zoom lens system of Patent Literature Nos. 1 through 3, since the refractive power (refractive power balance) of the lens groups are not appropriately determined, a favorable optical quality, acceptable for a zoom lens system for use in a digital single-lens reflex camera, cannot be achieved over the entire focal length range (zooming range).

The present invention has been devised in view of the above-described problems, and provides a zoom lens system which achieves a favorable optical quality over the entire focal length range (zooming range).

According to an aspect of the present invention, a zoom lens system is provided, including a positive first lens group, a negative second lens group, a positive third lens group, a negative fourth lens group, and a positive fifth lens group, in that order from the object side, wherein, during zooming from the short focal length extremity to the long focal length extremity, at least the first lens group, the third lens group and the fifth lens group move in an optical axis direction thereof. The fifth lens group includes a plurality of lens elements. A surface closest to the image side of the zoom lens system is a concave surface facing the image side. The following condition (1) is satisfied:

$$0.52 < (m345t/m345w)/(ft/fw) < 0.70 \quad (1)$$

wherein m345w designates the combined lateral magnification of the third lens group, the fourth lens group and the fifth lens group at the short focal length extremity when focused on an object at infinity; m345t designates the combined lateral magnification of the third lens group, the fourth lens group and the fifth lens group at the long focal length extremity when focused on an object at infinity; fw designates the focal length of the zoom lens system at the short focal length extremity; and ft designates the focal length of the zoom lens system at the long focal length extremity.

It is desirable for the following condition (2) to be satisfied:

$$0.4 < (m2t/m2w)/(ft/fw) \quad (2),$$

wherein m2w designates the lateral magnification of the second lens group at the short focal length extremity when focused on an object at infinity, m2t designates the lateral magnification of the second lens group at the long focal length extremity when focused on an object at infinity, fw designates the focal length of the zoom lens system at the short focal length extremity, and ft designates the focal length of the zoom lens system at the long focal length extremity.

A zoom lens system is provided, including a positive first lens group, a negative second lens group, a positive third lens group, a negative fourth lens group, and a positive fifth lens group, in that order from the object side, wherein, during zooming from the short focal length extremity to the long focal length extremity, at least the first lens group, the third lens group and said fifth lens group move in an optical axis direction thereof. A surface closest to the image side of the zoom lens system is a concave surface facing the image side. The following conditions (1) and (2) are satisfied:

$$0.52 < (m345t/m345w)/(ft/fw) < 0.70 \quad (1), \text{ and}$$

$$0.4 < (m2t/m2w)/(ft/fw) \quad (2),$$

wherein m345w designates the combined lateral magnification of the third lens group, the fourth lens group and the fifth lens group at the short focal length extremity when focused on an object at infinity; m345t designates the combined lateral magnification of the third lens group, the fourth lens group and the fifth lens group at the long focal length extremity when focused on an object at infinity; m2w designates the lateral magnification of the second lens group at the short focal length extremity when focused on an object at infinity; m2t designates the lateral magnification of the second lens group at the long focal length extremity when focused on an object at infinity; fw designates the focal length of the zoom lens system at the short focal length extremity, and ft designates the focal length of the zoom lens system at the long focal length extremity.

It is desirable for the zoom lens system to satisfy the following condition (2') within the scope of condition (2):

$$0.4 < (m2t/m2w)/(ft/fw) < 1.0 \quad (2').$$

It is desirable for the fourth lens group to have a plurality of lens elements.

It is desirable for the fifth lens group to include a positive single lens element, and a cemented lens formed of a negative single lens element and a positive single lens element, in that order from the object side.

It is desirable for the following condition (3) to be satisfied:

$$-2.0<(Rsi+Rdo)/(Rsi-Rdo)<-1.0 \quad (3),$$

wherein Rsi designates the radius of curvature of the surface on the image side of the positive single lens element that is provided closest to the object side within the fifth lens group, and Rdo designates the radius of curvature of the surface on the object side of the cemented lens that is provided within the fifth lens group.

It is desirable for the following condition (4) to be satisfied:

$$(np-nn)/Rb \times 1000<-3.0 \quad (4),$$

wherein np designates the refractive index at the d-line of the positive single lens element of the cemented lens that is provided within the fifth lens group, nn designates the refractive index at the d-line of the negative single lens element of the cemented lens that is provided within the fifth lens group, and Rb designates the radius of curvature of a cemented surface of the cemented lens that is provided within the fifth lens group.

It is desirable for a surface closest to the image side of the fifth lens group to be a concave surface facing the image side.

It is desirable for the zoom lens system to satisfy the following condition (5):

$$0.4<(m3t/m3w)/(ft/fw) \quad (5),$$

wherein m3w designates the lateral magnification of the third lens group at the short focal length extremity when focusing on an object at infinity, m3t designates the lateral magnification of the third lens group at the long focal length extremity when focusing on an object at infinity, fw designates the focal length of the zoom lens system at the short focal length extremity, and ft designates the focal length of the zoom lens system at the long focal length extremity.

It is desirable for the zoom lens system to satisfy the following condition (5') within the scope of condition (5):

$$0.5<(m3t/m3w)/(ft/fw)<1.0 \quad (5').$$

It is desirable for the following condition (6) to be satisfied:

$$-0.7<(Rdo+Rdi)/(RDo-Rdi)<0.7 \quad (6),$$

wherein

Rdo designates the radius of curvature of a surface on the object side of the cemented lens that is provided within the fifth lens group (the surface on the object side of the negative single lens element), and Rdi designates the radius of curvature of a surface on the image side of the cemented lens that is provided within the fifth lens group (the surface on the image side of the positive single lens element)

According to the present invention, a zoom lens system having a favorable optical quality over the entire focal length range (zooming range) can be achieved.

The present disclosure relates to subject matter contained in Japanese Patent Application No. 2014-238527 (filed on Nov. 26, 2014) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1;

FIGS. 3A, 3B, 3C and 3D show lateral aberrations that occurred in the lens arrangement shown in FIG. 1;

FIGS. 8A, 8B, 8C and 8D show various aberrations that occurred in the lens arrangement shown in FIG. 7;

FIGS. 9A, 9B, 9C and 9D show lateral aberrations that occurred in the lens arrangement shown in FIG. 7;

FIGS. 11A, 11B, 11C and 11D show various aberrations that occurred in the lens arrangement shown in FIG. 10;

FIGS. 12A, 12B, 12C and 12D show lateral aberrations that occurred in the lens arrangement shown in FIG. 10;

FIG. 13 shows a lens arrangement of a third numerical embodiment of a zoom lens system, according to the present invention, at the short focal length extremity when focused on an object at infinity;

FIGS. 14A, 14B, 14C and 14D show various aberrations that occurred in the lens arrangement shown in FIG. 13;

FIGS. 15A, 15B, 15C and 15D show lateral aberrations that occurred in the lens arrangement shown in FIG. 13;

FIGS. 20A, 20B, 20C and 20D show various aberrations that occurred in the lens arrangement shown in FIG. 19;

FIGS. 21A, 21B, 21C and 21D show lateral aberrations that occurred in the lens arrangement shown in FIG. 19;

FIGS. 23A, 23B, 23C and 23D show various aberrations that occurred in the lens arrangement shown in FIG. 22;

FIGS. 24A, 24B, 24C and 24D show lateral aberrations that occurred in the lens arrangement shown in FIG. 22;

FIGS. 29A, 29B, 29C and 29D show various aberrations that occurred in the lens arrangement shown in FIG. 28;

FIGS. 30A, 30B, 30C and 30D show lateral aberrations that occurred in the lens arrangement shown in FIG. 28;

FIG. 31 shows a first zoom path of the zoom lens system according to the present invention;

FIG. 32 shows a second zoom path of the zoom lens system according to the present invention; and FIG. 33 shows a third zoom path of the zoom lens system according to the present invention.

DESCRIPTION OF THE EMBODIMENTS

Figure 1:
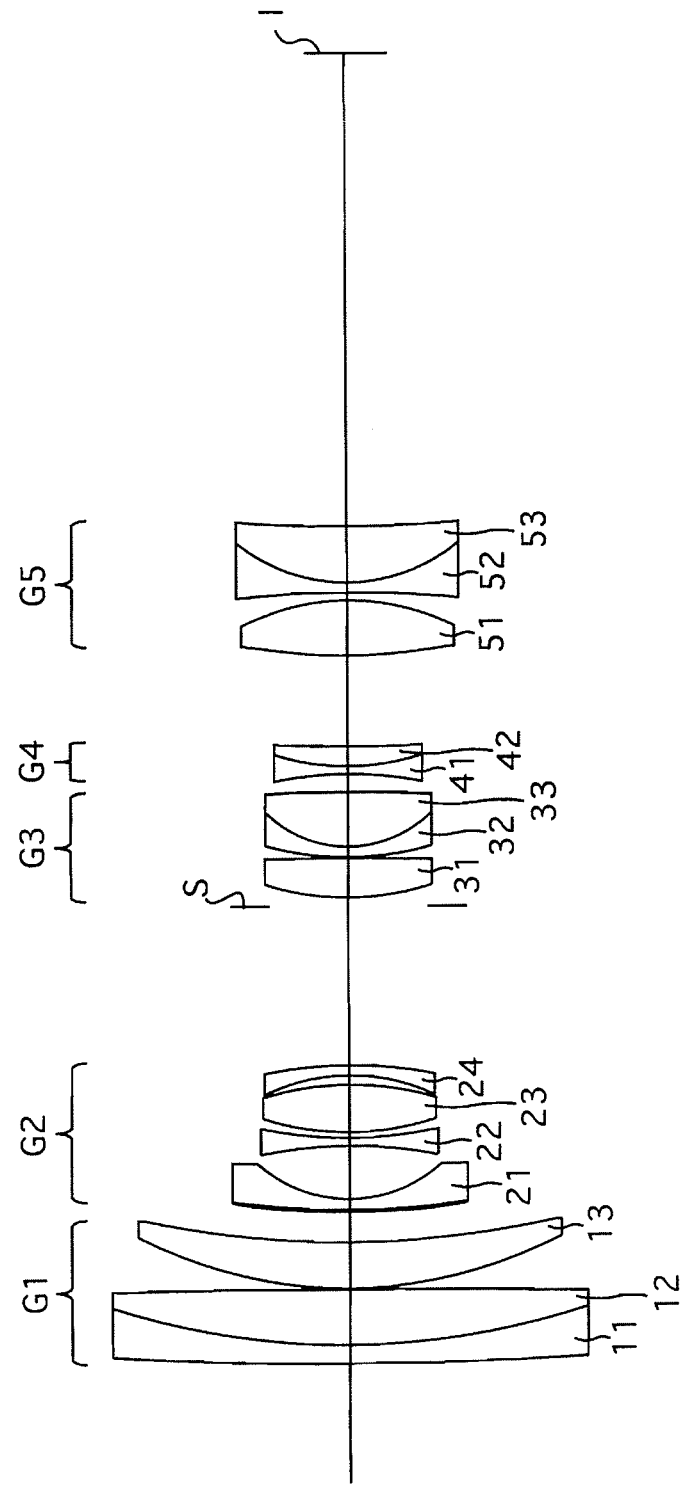
FIG. 1 shows a lens arrangement of a first numerical embodiment of a zoom lens system, according to the present invention, at the short focal length extremity when focused on an object at infinity.

As shown in the zoom paths of FIGS. 31 through 33, the zoom lens system of each of the first through fifth numerical embodiments is configured of a positive first lens group G1, a negative second lens group G2, a positive third lens group G3, a negative fourth lens group G4, and a positive fifth lens group G5, in that order from the object side. A diaphragm S is provided between the second lens group G2 and the third lens group G3 (and immediately in front of the third lens group G3). The diaphragm S integrally moves with the third lens group G3. "I" designates the imaging plane.

As shown in zoom paths of FIGS. 31 through 33, in the zoom lens system in each of the first through fifth numerical embodiments, during zooming from the short focal length extremity (Wide) to the long focal length extremity (Tele), the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

In each of the first through fifth numerical embodiments, the first lens group G1, the third lens group G3, the fourth lens group G4 and the fifth lens group G5 move toward the object side during zooming from the short focal length extremity to the long focal length extremity (see FIGS. 31 through 33).

In each of the first through fourth numerical embodiments, the second lens group G2 moves toward the object side during zooming from the short focal length extremity to the long focal length extremity (see FIGS. 31 and 32), and in the fifth numerical embodiment the second lens group G2 moves toward the image side from the short focal length extremity to the long focal length extremity (see FIG. 33).

In each of the first through third numerical embodiments, the third lens group G3 and the fifth lens group G5 integrally move toward the object side during zooming from the short focal length extremity to the long focal length extremity (see FIG. 31). Accordingly to such a configuration, the mechanical structure of the lens frames can be simplified, thereby reducing costs. Furthermore, such a configuration reduces the possibility of manufacturing error occurring, which is advantageous for maintaining a practical optical quality.

In each of the fourth and fifth numerical embodiments, the third lens group G3 and the fifth lens group G5 independently move toward the object side during zooming from the short focal length extremity to the long focal length extremity (see FIGS. 32 and 33). Since the zooming operation has added freedom due to this configuration, there is the advantage of fluctuations in aberrations occurring during zooming being easier to correct.

Hence, the present invention can be applied to the illustrated embodiments of the zoom lens system regardless of whether the third and fifth lens groups G3 and G5 integrally or independently move.

Furthermore, in the zoom lens system of the illustrated embodiments, it is necessary for at least the first lens group G1, the third lens group G3 and the fifth lens group G5 to move in the optical axis direction during zooming from the short focal length extremity to the long focal length extremity. Namely, the second lens group G2 and the fourth lens group G4 have a certain amount of freedom in regard to the movement (behavior) thereof during zooming from the long focal length extremity to the long focal length extremity; e.g., it is possible for the second lens group G2 and the fourth lens group G4 to be immovable in the optical axis direction (remain stationary relative to the imaging plane I), or to first move in the optical axis direction and thereafter return (i.e., U-turn) to a position that is same as the short focal length extremity.

In each of the first through fifth numerical embodiments, the first lens group G1 is configured of a negative lens element 11, a positive lens element 12 and a positive lens element 13, in that order from the object side. The negative lens element 11 and the positive lens element 12 are cemented to each other.

In each of the first through fifth numerical embodiments, the second lens group G2 is configured of a negative lens element 21, a negative lens element 22, a positive lens element 23 and a negative lens element 24, in that order from the object side.

In each of the first through fourth numerical embodiments, the second lens element 21 is configured of a hybrid lens formed by a glass lens element with an aspherical surface layer, formed from a synthetic resin material, adhered onto the object side thereof.

In the fifth numerical embodiment, the second lens element 21 is provided with an aspherical surface on the object side (is not a hybrid lens).

In each of the first through fourth numerical embodiments, the third lens group G3 is configured of a positive lens element 31, a negative lens element 32 and a positive lens element 33, in that order from the object side. The negative lens element 32 and the positive lens element 33 are cemented to each other.

In the fifth numerical embodiment, the third lens group G3 is configured of a positive lens element 31', a positive lens element 32' and a negative lens element 33', in that order from the object side. An aspherical surface is formed on the object side of the positive lens element 32'. The positive lens element 32' and the negative lens element 33' are cemented to each other.

In each of the first through fourth numerical embodiments, the fourth lens group G4 is configured of a cemented lens having a negative lens element 41 and a positive lens element 42, in that order from the object side.

In the fifth numerical embodiment, the fourth lens group G4 is configured of a positive lens element 41', a negative lens element 42' and a positive lens element 43', in that order from the object side. The positive lens element 41' and the negative lens element 42' are cemented to each other.

In each of the first through fifth numerical embodiments, the fifth lens group G5 is configured of a positive lens element (positive single lens element) 51, a negative lens element (negative single lens element) 52 and a positive lens element (positive single lens element) 53, in that order from the object side. The negative lens element 52 and the positive lens element 53 are cemented to each other.

In each of the first through fourth numerical embodiments, the positive lens element 51 is provided with an aspherical surface on each side thereof, and in the fifth numerical embodiment, the an aspherical surface is formed only on the object side (not on each side) thereof.

The zoom lens system of the illustrated embodiments is a positive-lead zoom lens system having a five-lens-group configuration that is provided with a positive lens group, a negative lens group, a positive lens group, a negative lens group and a positive lens group, in that order from the object side. According to this configuration, the overall length of the zoom lens system at the short focal length extremity can be shortened compared to that of a negative-lead zoom lens system, and additional freedom in the movement of the lens groups can be attained compared to that of a four-lens-group configuration, so that aberration fluctuations that occur during zooming can be suppressed.

Furthermore, in the zoom lens system of the illustrated embodiments, the fifth lens group G5 is configured of a plurality of lens elements (the positive lens element 51, the negative lens element 52 and the positive lens element 53, i.e., three lens elements). Due to such a configuration, additional freedom is attained for the correction of spherical aberration, coma and chromatic aberration, so that a favorable optical quality can be achieved.

Furthermore, in the zoom lens system of the illustrated embodiments, by determining an optimal balance of the refractive-power distribution (refractive-power balance) among the lens groups, fluctuation in aberrations occurring during zooming can be successfully suppressed so that a favorable optical quality over the entire focal length range (zooming range) can be achieved, and the lens frame structure can be simplified, thereby successfully reducing costs.

Condition (1) specifies the contribution toward zooming of the combined optical system consisting of the third, fourth and fifth lens groups G3, G4 and G5. By satisfying condition (1), aberration fluctuations that occur during zooming (e.g., distortion at the short focal length extremity and lateral chromatic aberration at the long focal length extremity) can be suppressed, thereby achieving a favorable optical quality over the entire focal length range (zooming range), and the lens frame structure can be simplified, thereby successfully reducing costs.

If the upper limit of condition (1) is exceeded, this indicates that the contribution toward zooming of the combined optical system consisting of the third, fourth and fifth lens groups G3, G4 and G5 from the short focal length extremity to the long focal length extremity is excessive. Accordingly, if the refractive power of the lens groups is set at a fixed amount, the movement amounts of the lens groups during zooming from the short focal length extremity to the long focal length extremity increase, thereby enlarging the size of the lens frames. Alternatively, the refractive power of each lens group increases, so that aberration fluctuations that occur during zooming cannot be adequately corrected while a greater precision in the lens frame structure would be required in order to suppress optical deterioration caused by decentration, thereby incurring an increase in costs.

If the lower limit of condition (1) is exceeded, this indicates that the contribution toward zooming of the combined optical system consisting of the third, fourth and fifth lens groups G3, G4 and G5 from the short focal length extremity to the long focal length extremity is insufficient. Accordingly, the distribution of refractive power between the object side (front side) and the image side (rear side) of the optical system (i.e., the refractive-power balance between the combined optical system consisting of the first lens group G1 and the second lens group G2, and the combined optical system consisting of the third, fourth and fifth lens groups G3, G4 and G5) is inappropriate, thereby increasing distortion at the short focal length extremity and increasing lateral chromatic aberration at the long focal length extremity.

Conditions (2) and (2') specify the contribution toward zooming of the second lens group G2. By satisfying condition (2), since the contribution that the second lens group G2 has toward zooming (with respect to zooming from the short focal length extremity to the long focal length extremity) can be optimized, aberration fluctuations that occur during zooming (e.g., distortion at the short focal length extremity and lateral chromatic aberration at the long focal length extremity) can be suppressed, and the lens frame structure can be simplified, thereby reducing costs. By satisfying condition (2'), aberration fluctuations that occur during zooming can be further suppressed, so that a favorable optical quality can be achieved over the entire focal length range (zooming range), and the lens frame structure can be simplified, thereby reducing costs.

If the upper limit of condition (2') is exceeded, since the contribution toward zooming of the second lens group G2 from the short focal length extremity to the long focal length extremity is excessive, the distribution of the refractive power between the object side (front side) and the image side (rear side) of the optical system (i.e., the refractive-power balance between the combined optical system consisting of the first lens group G1 and the second lens group G2, and the combined optical system consisting of the third, fourth and fifth lens groups G3, G4 and G5) is inappropriate, thereby increasing distortion at the short focal length extremity and increasing lateral chromatic aberration at the long focal length extremity.

If the lower limit of condition (2) is exceeded, since the contribution toward zooming of the second lens group G2 from the short focal length extremity to the long focal length extremity is insufficient, the contribution toward zooming of the other lens groups from the short focal length extremity to the long focal length extremity becomes excessive, so that aberration fluctuations cannot be sufficiently corrected.

Furthermore, even if the fifth lens group G5 of the zoom lens system of the illustrated embodiments is not configured of a plurality of lens elements (e.g., even if the fifth lens group G5 were to be configured of a positive single lens element), by satisfying all of conditions (1), and (2) or (2'), such an independent aspect of the present invention can achieve suppression of aberration fluctuations that occur during zooming (e.g., distortion at the short focal length extremity and lateral chromatic aberration at the long focal length extremity) so that a favorable optical quality can be achieved over the entire focal length range (zooming range) while simplifying the lens construction, thereby reducing costs.

In the zoom lens system of the illustrated embodiments, the fourth lens group G4 is configured of a plurality of lens elements (two lens elements consisting of the negative lens element 41 and the positive lens element 42, or three lens elements consisting of the positive lens element 41', the negative lens element 42', and the positive lens element 43'). According to such a configuration, chromatic aberration and field curvature which occur during zooming can be suppressed. Correction of chromatic aberration is especially facilitated if a cemented lens formed from a positive lens element and a negative lens element is provided within the fourth lens group G4.

In the zoom lens system of the illustrated embodiments, the fifth lens group G5 is configured of a cemented lens formed of a positive lens element (positive single lens element) 51, a negative lens element (negative single lens element) 52 and a positive lens element (positive single lens element) 53, in that order from the object side. By configuring the fifth lens group G5 from three lens elements consisting of a positive lens element, a negative lens element and a positive lens element, in that order from the object side, the refractive-power distribution profile within the fifth lens group G5 is nearly symmetrical, so that occurrence of abaxial aberrations can be reduced. Furthermore, correction of chromatic aberration is facilitated if a cemented lens formed from a positive lens element and a negative lens element is provided within the fifth lens group G5.

Condition (3) specifies the profile of an air lens that is defined between the surface on the image side of the positive single lens element 51 that is provided closest to the object side within the fifth lens group G5 and the surface on the object side of the cemented lens that is provided within the fifth lens group G5 (the surface on the object side of the negative single lens element 52). By satisfying condition (3), coma and field curvature (sagittal field curvature), etc., can be favorably corrected.

If the upper limit of condition (3) is exceeded, correction of coma at the short focal length extremity becomes insufficient.

If the lower limit of condition (3) is exceeded, correction of sagittal field curvature at the long focal length extremity becomes insufficient.

Condition (4) specifies the refractive power of the cemented surface of the cemented lens that is provided within the fifth lens group G5 (the cemented lens formed of the negative single lens element 52 and the positive single lens element 53). By satisfying condition (4), astigmatism, chromatic aberration (lateral chromatic aberration), and field curvature can be favorably corrected.

If the upper limit of condition (4) is exceeded, astigmatism at the short focal length extremity increases.

If the lower limit of condition (4) is exceeded, correction of lateral chromatic aberration at the long focal length extremity becomes insufficient.

In the zoom lens system of the illustrated embodiments, the surface closest to the image side of the fifth lens group G5 (the surface on the image side of the positive lens element 53) is a concave surface. According to this configuration, a sufficiently long backfocus can be attained, and coma and sagittal field curvature can be favorably corrected.

Conditions (5) and (5') specify the contribution toward zooming of the third lens group G3. By satisfying conditions (5) and (5'), aberration fluctuations that occur during zooming (e.g., distortion at the short focal length extremity and lateral chromatic aberration at the long focal length extremity) can be suppressed, thereby achieving a favorable optical quality over the entire focal length range (zooming range), and the lens frame structure can be simplified, thereby successfully reducing costs.

If the upper limit of condition (5') is exceeded, since the contribution toward zooming of the third lens group G3 from the short focal length extremity to the long focal length extremity is excessive, correction of aberration fluctuations that occur during zooming become insufficient, and in order to suppress deterioration in optical quality that is caused by decentration, a higher precision in the lens frame structure is demanded, thereby increasing costs.

If the lower limit of condition (5) is exceeded, since the contribution toward zooming of the third lens group G3 is insufficient, the distribution of refractive power between the object side (front side) and the image side (rear side) of the optical system (i.e., the refractive-power balance between the combined optical system consisting of the first lens group G1 and the second lens group G2, and the combined optical system consisting of the third, fourth and fifth lens groups G3, G4 and G5) is inappropriate, thereby increasing distortion at the short focal length extremity and increasing lateral chromatic aberration at the long focal length extremity.

Condition (6) specifies the profile (shaping factor) of the cemented lens which is provided within the fifth lens group G5. By satisfying condition (6), coma and field curvature (sagittal field curvature), etc., can be favorably corrected.

If the upper limit of condition (6) is exceeded, correction of sagittal field curvature at the long focal length extremity becomes insufficient.

If the lower limit of condition (6) is exceeded, correction of coma at the short focal length extremity becomes insufficient.

Specific first through fifth numerical embodiments will be herein discussed. In the various aberration diagrams, lateral aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν(d) designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. The unit used for the various lengths is defined in millimeters (mm).

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

FIGS. 1 through 6D and Tables 1 through 4 show a first numerical embodiment of the zoom lens system according to the present invention. FIG. 1 shows a lens arrangement of the first numerical embodiment of the zoom lens system at the short focal length extremity when focused on an object at infinity. FIGS. 2A, 2B, 2C and 2D show various aberrations that occurred in the lens arrangement shown in FIG. 1.

Figure 4:
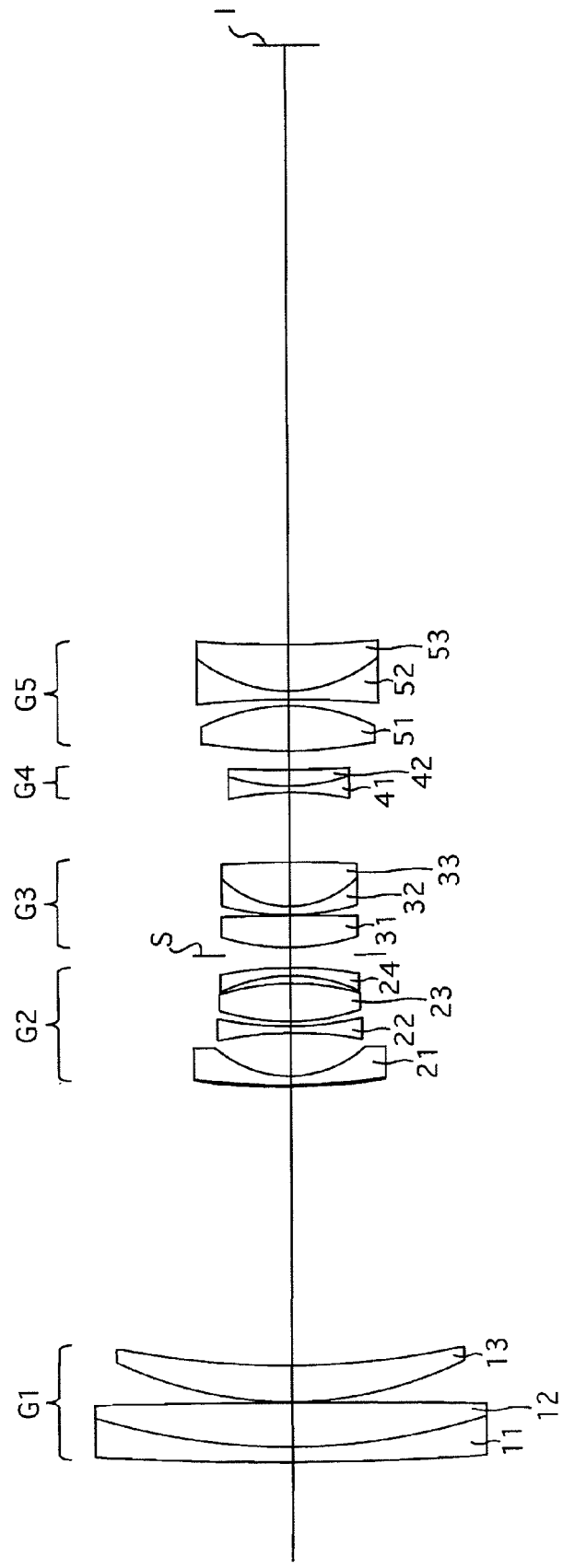
FIG. 4 shows a lens arrangement of the first numerical embodiment of the zoom lens system at the long focal length extremity when focused on an object at infinity.
Figure 5A:
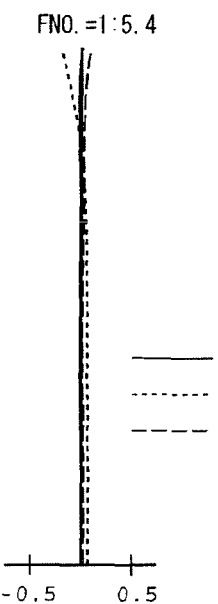
FIGS. 5A, 5B, 5C and 5D show various aberrations that occurred in the lens arrangement shown in FIG. 4.
Figure 5B:
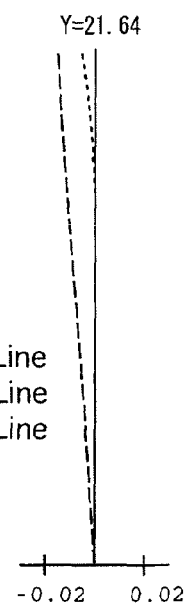
Figure 5C:
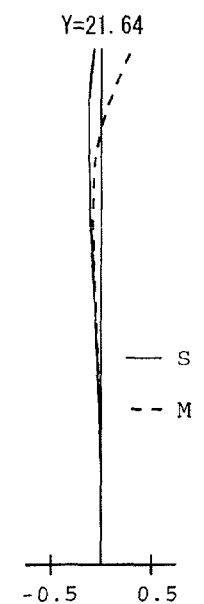
Figure 5D:
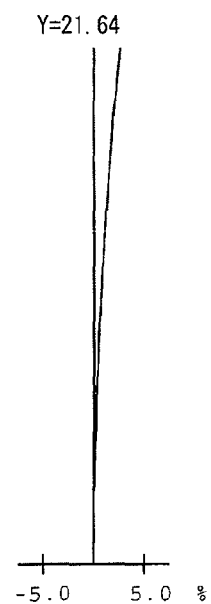
Figure 6A:
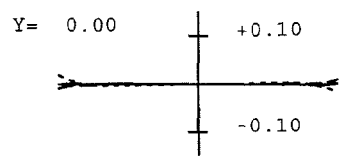
FIGS. 6A, 6B, 6C and 6D show lateral aberrations that occurred in the lens arrangement shown in FIG. 4.
Figure 6B:
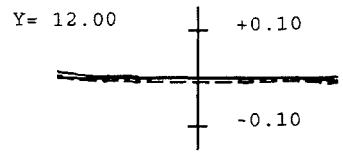
Figure 6C:
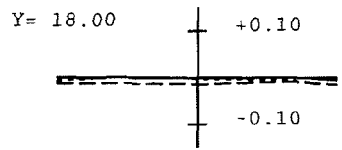
Figure 6D:
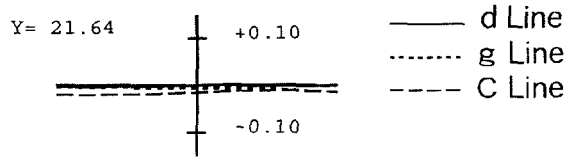

FIGS. 3A, 3B, 3C and 3D show lateral aberrations that occurred in the lens arrangement shown in FIG. 1. FIG. 4 shows a lens arrangement of the first numerical embodiment of the zoom lens system at the long focal length extremity when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 1 shows the lens surface data, Table 2 shows various lens-system data, Table 3 shows the aspherical surface data, and Table 4 shows the lens group data of the zoom lens system.

The zoom lens system of the first numerical embodiment is configured of a positive first lens group G1, a negative second lens group G2, a positive third lens group G3, a negative fourth lens group G4 and a positive fifth lens group G5, in that order from the object side. A diaphragm S is provided between the second lens group G2 and the third lens group G3 (and positioned immediately in front of the third lens group G3); the diaphragm S moves integrally with the third lens group G3 during zooming.

The first lens group G1 is configured of a negative meniscus lens element 11 having a convex surface on the object side, a positive biconvex lens element 12, and a positive meniscus lens element 13 having a convex surface on the object side, in that order from the object side. The negative meniscus lens element 11 and the positive biconvex lens element 12 are cemented to each other.

The second lens group G2 is configured of a negative meniscus lens element 21 having a convex surface on the object side, a biconcave negative lens element 22, a biconvex positive lens element 23, and a negative meniscus lens element 24 having a convex surface on the image side, in that order from the object side. The negative meniscus lens element 21 is configured of a hybrid lens formed by a glass lens element with an aspherical surface layer, formed from a synthetic resin material, adhered onto the object side thereof.

The third lens group G3 is configured of a biconvex positive lens element 31, a negative meniscus lens element 32 having a convex surface on the object side, and a biconvex positive lens element 33, in that order from the object side. The negative meniscus lens element 32 and the biconvex positive lens element 33 are cemented to each other.

The fourth lens group G4 is configured of a cemented lens formed of a biconcave negative lens element 41 and a positive meniscus lens element 42 having a convex surface on the object side, in that order from the object side.

The fifth lens group G5 is configured of a biconvex positive lens element (positive single lens element) 51, a biconcave negative lens element (negative single lens element) 52, and a positive meniscus lens element (positive single lens element) 53 having a convex surface on the object side, in that order from the object side. An aspherical surface is formed on each side of the biconvex positive lens element 51. The biconcave negative lens element 52 and the positive meniscus lens element 53 are cemented to each other.

TABLE 1

LENS SURFACE DATA

| Surf. No. | R | d | N (d) | ν (d) |
|---|---|---|---|---|
| 1 | 410.171 | 1.960 | 1.84666 | 23.8 |
| 2 | 83.215 | 5.640 | 1.81600 | 46.6 |
| 3 | -1277.157 | 0.100 | | |
| 4 | 50.036 | 4.650 | 1.77250 | 49.6 |
| 5 | 105.613 | d5 | | |
| 6* | 143.187 | 0.200 | 1.52972 | 42.7 |
| 7 | 95.477 | 1.100 | 1.88300 | 40.8 |
| 8 | 14.866 | 5.360 | | |
| 9 | -46.875 | 0.820 | 1.81600 | 46.6 |
| 10 | 45.209 | 0.600 | | |
| 11 | 30.677 | 4.710 | 1.76182 | 26.5 |
| 12 | -31.071 | 0.960 | | |
| 13 | -20.644 | 1.030 | 1.81600 | 46.6 |
| 14 | -45.551 | d14 | | |
| 15 (Diaphragm) | ∞ | 0.900 | | |
| 16 | 29.977 | 3.950 | 1.72916 | 54.7 |
| 17 | -291.473 | 0.100 | | |
| 18 | 33.388 | 1.050 | 1.68893 | 31.1 |
| 19 | 12.573 | 5.490 | 1.49700 | 81.6 |
| 20 | -156.076 | d20 | | |
| 21 | -38.549 | 0.800 | 1.72916 | 54.7 |
| 22 | 25.901 | 2.000 | 1.84666 | 23.8 |
| 23 | 158.139 | d23 | | |
| 24* | 50.113 | 5.610 | 1.58913 | 60.9 |
| 25* | -23.973 | 0.800 | | |
| 26 | -120.116 | 1.000 | 1.80610 | 33.3 |
| 27 | 18.582 | 5.740 | 1.72916 | 54.7 |
| 28 | 155.537 | — | | |

The asterisk (*) designates an aspherical surface which is rotationally symmetrical with respect to the optical axis.

TABLE 2

LENS-SYSTEM DATA
Zoom Ratio: 3.64

| | Short Focal Length Extremity | Intermediate Focal Length | Long Focal Length Extremity |
|---|---|---|---|
| FNO. | 3.6 | 4.5 | 5.4 |
| f | 28.86 | 55.03 | 105.00 |
| W | 38.1 | 21.0 | 11.4 |
| Y | 21.64 | 21.64 | 21.64 |
| fB | 47.34 | 59.71 | 73.97 |
| L | 131.98 | 151.95 | 175.57 |
| d5 | 3.114 | 19.092 | 34.569 |
| d14 | 16.013 | 7.623 | 1.507 |
| d20 | 1.743 | 6.033 | 8.618 |
| d23 | 9.206 | 4.916 | 2.331 |

TABLE 3

ASPHERICAL SURFACE DATA

| Surf. No. | K | A4 | A6 | A8 | A10 |
|---|---|---|---|---|---|
| 6 | 0.000 | 0.1615E-04 | -0.1303E-07 | -0.1688E-10 | 0.3724E-12 |
| 24 | 0.000 | -0.1841E-04 | -0.5053E-08 | 0.1403E-09 | -0.9226E-13 |
| 25 | 0.000 | 0.9006E-05 | -0.4436E-08 | -0.7175E-10 | 0.7279E-12 |

TABLE 4

LENS GROUP DATA

| Lens Group | 1st Surface | Focal Length |
|---|---|---|
| 1 | 1 | 93.18 |
| 2 | 6 | −17.02 |
| 3 | 16 | 28.81 |
| 4 | 21 | −50.45 |
| 5 | 24 | 46.75 |

Numerical Embodiment 2

Figure 7:
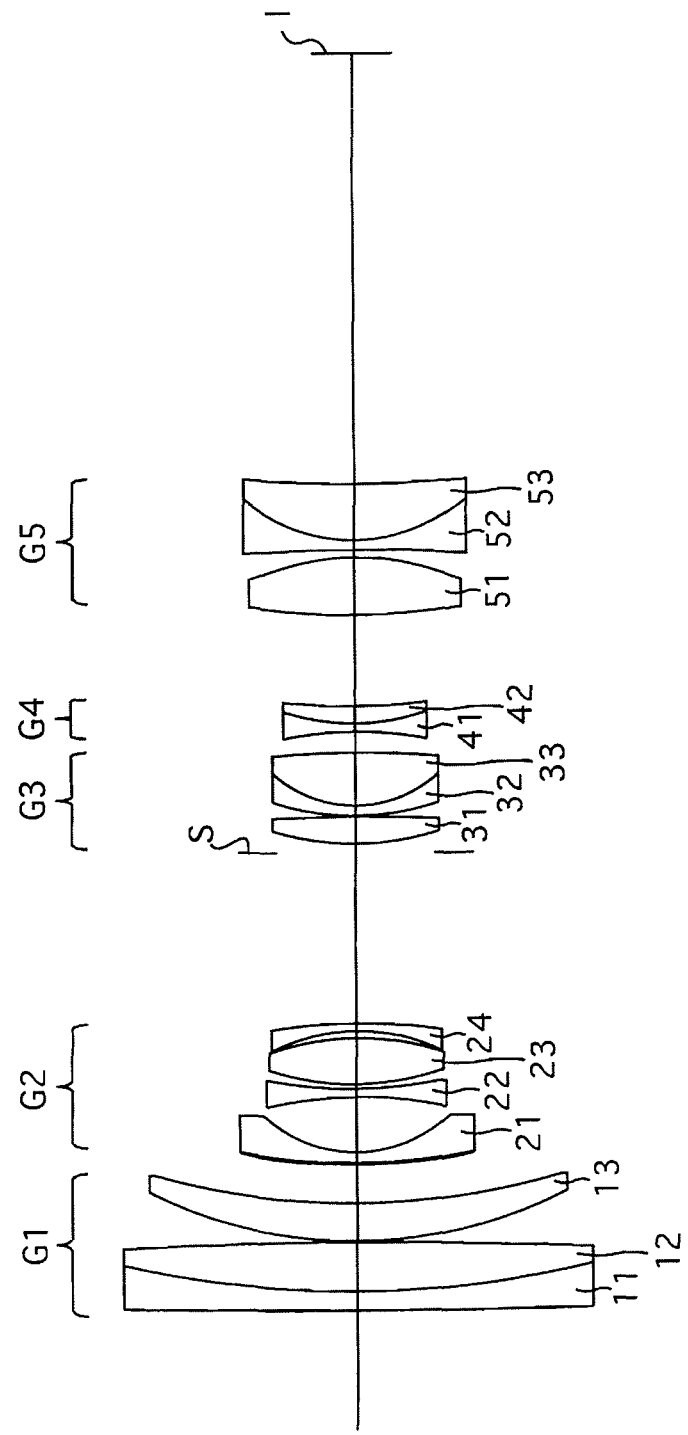
FIG. 7 shows a lens arrangement of a second numerical embodiment of a zoom lens system, according to the present invention, at the short focal length extremity when focused on an object at infinity.
Figure 10:
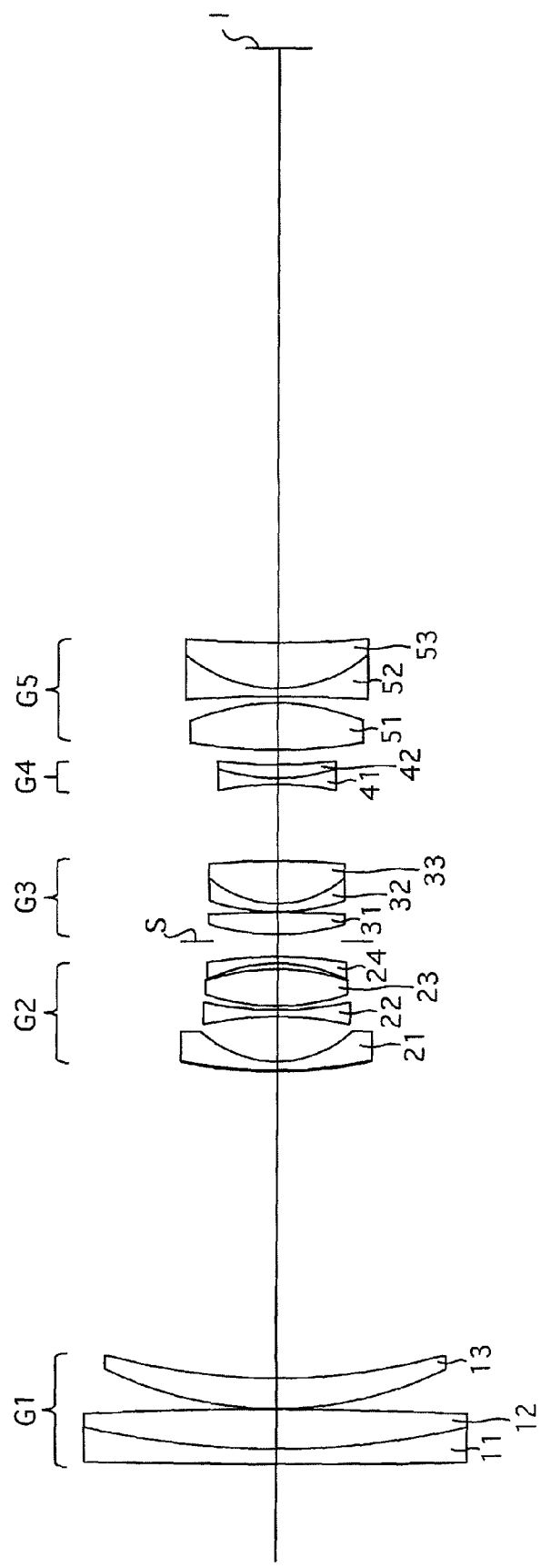
FIG. 10 shows a lens arrangement of the second numerical embodiment of the zoom lens system at the long focal length extremity when focused on an object at infinity.

FIGS. 7 through 12D and Tables 5 through 8 show a second numerical embodiment of the zoom lens system according to the present invention. FIG. 7 shows a lens arrangement of the second numerical embodiment of the zoom lens system at the short focal length extremity when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. FIG. 10 shows a lens arrangement of the second numerical embodiment of the zoom lens system at the long focal length extremity when focused on an object at infinity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 5 shows the lens surface data, Table 6 shows various lens-system data, Table 7 shows the aspherical surface data, and Table 8 shows the lens group data of the zoom lens system.

The fundamental lens arrangement of the second numerical embodiment is the same as that of the first numerical embodiment.

TABLE 5

LENS SURFACE DATA

| Surf. No. | R | d | N (d) | ν (d) |
|---|---|---|---|---|
| 1 | 1208.960 | 1.960 | 1.84666 | 23.8 |
| 2 | 110.306 | 5.070 | 1.81600 | 46.6 |
| 3 | −518.616 | 0.100 | | |
| 4 | 49.637 | 3.910 | 1.81600 | 46.6 |
| 5 | 79.494 | d5 | | |
| 6* | 81.778 | 0.150 | 1.52972 | 42.7 |
| 7 | 64.271 | 1.100 | 1.88300 | 40.8 |
| 8 | 14.655 | 5.690 | | |
| 9 | −43.844 | 0.820 | 1.72916 | 54.7 |
| 10 | 47.989 | 0.480 | | |
| 11 | 29.516 | 4.710 | 1.72825 | 28.5 |
| 12 | −29.402 | 0.710 | | |
| 13 | −21.069 | 0.800 | 1.78800 | 47.4 |
| 14 | −58.831 | d14 | | |
| 15 (Diaphragm) | ∞ | 0.910 | | |
| 16 | 31.214 | 2.750 | 1.69680 | 55.5 |
| 17 | −171.680 | 0.100 | | |
| 18 | 28.446 | 1.040 | 1.80000 | 29.9 |

TABLE 5-continued

LENS SURFACE DATA

| Surf. No. | R | d | N (d) | ν (d) |
|---|---|---|---|---|
| 19 | 13.443 | 5.400 | 1.49700 | 81.6 |
| 20 | −100.868 | d20 | | |
| 21 | −39.830 | 0.800 | 1.60311 | 60.7 |
| 22 | 24.992 | 1.720 | 1.84666 | 23.8 |
| 23 | 62.616 | d23 | | |
| 24* | 63.837 | 6.000 | 1.58913 | 61.2 |
| 25* | −25.726 | 0.770 | | |
| 26 | −174.966 | 1.000 | 1.72047 | 34.7 |
| 27 | 18.437 | 5.760 | 1.61800 | 63.4 |
| 28 | 142.496 | — | | |

The asterisk (*) designates an aspherical surface which is rotationally symmetrical with respect to the optical axis.

TABLE 6

ZOOM LENS SYSTEM DATA
Zoom Ratio 3.57

| | Short Focal Length Extremity | Intermediate Focal Length | Long Focal Length Extremity |
|---|---|---|---|
| FNO. | 3.6 | 4.6 | 5.7 |
| f | 28.70 | 54.99 | 102.38 |
| W | 38.1 | 21.1 | 11.7 |
| Y | 21.64 | 21.64 | 21.64 |
| fB | 43.84 | 57.56 | 75.00 |
| L | 128.65 | 150.19 | 179.18 |
| d5 | 3.978 | 21.488 | 38.964 |
| d14 | 17.516 | 7.822 | 1.900 |
| d20 | 2.150 | 6.879 | 9.716 |
| d23 | 9.416 | 4.688 | 1.850 |

TABLE 7

ASPHERICAL SURFACE DATA

| Surf. No. | K | A4 | A6 | A8 | A10 |
|---|---|---|---|---|---|
| 6 | 0.000 | 0.1315E−04 | 0.7792E−08 | −0.1085E−09 | 0.6816E−12 |
| 24 | 0.000 | −0.1280E−04 | −0.1703E−07 | 0.6628E−09 | 0.4269E−12 |
| 25 | 0.000 | 0.9220E−05 | 0.2232E−07 | −0.1534E−09 | 0.3866E−11 |

TABLE 8

LENS GROUP DATA

| Lens Group | 1st Surface | Focal Length |
|---|---|---|
| 1 | 1 | 116.81 |
| 2 | 6 | −18.44 |
| 3 | 16 | 27.54 |
| 4 | 21 | −52.59 |
| 5 | 24 | 53.63 |

Numerical Embodiment 3

Figure 16:
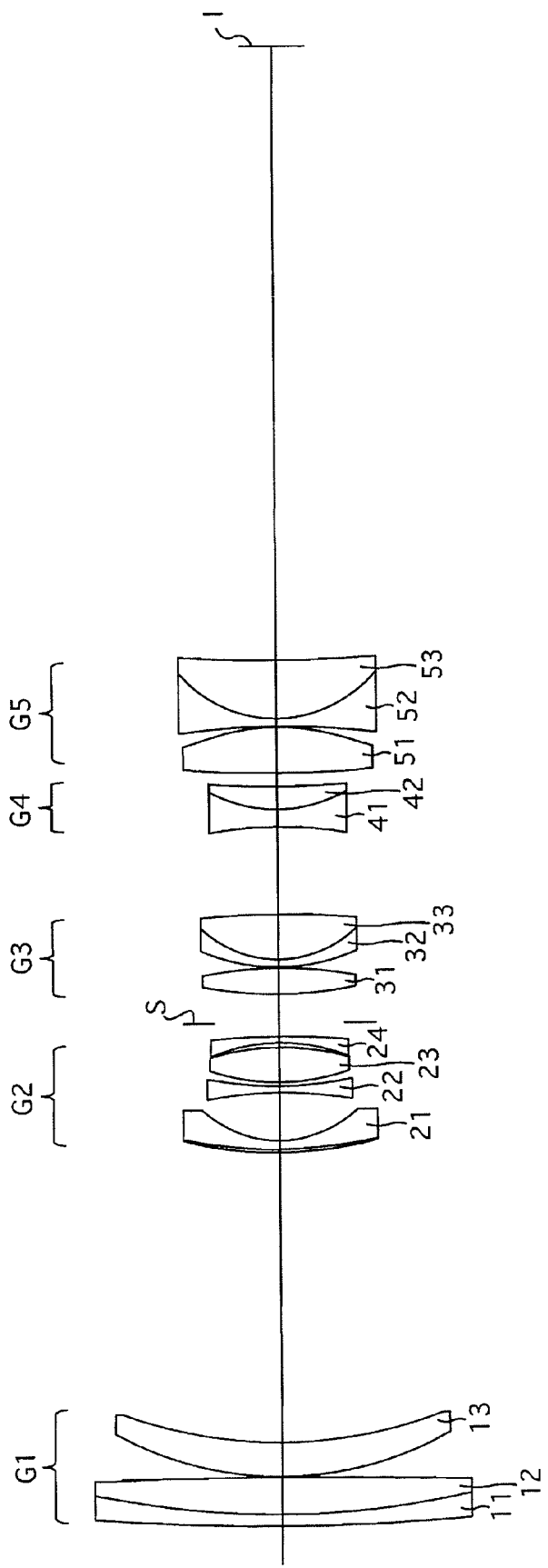
FIG. 16 shows a lens arrangement of the third numerical embodiment of the zoom lens system at the long focal length extremity when focused on an object at infinity.
Figures 17A, 17B, 17C, 17D:
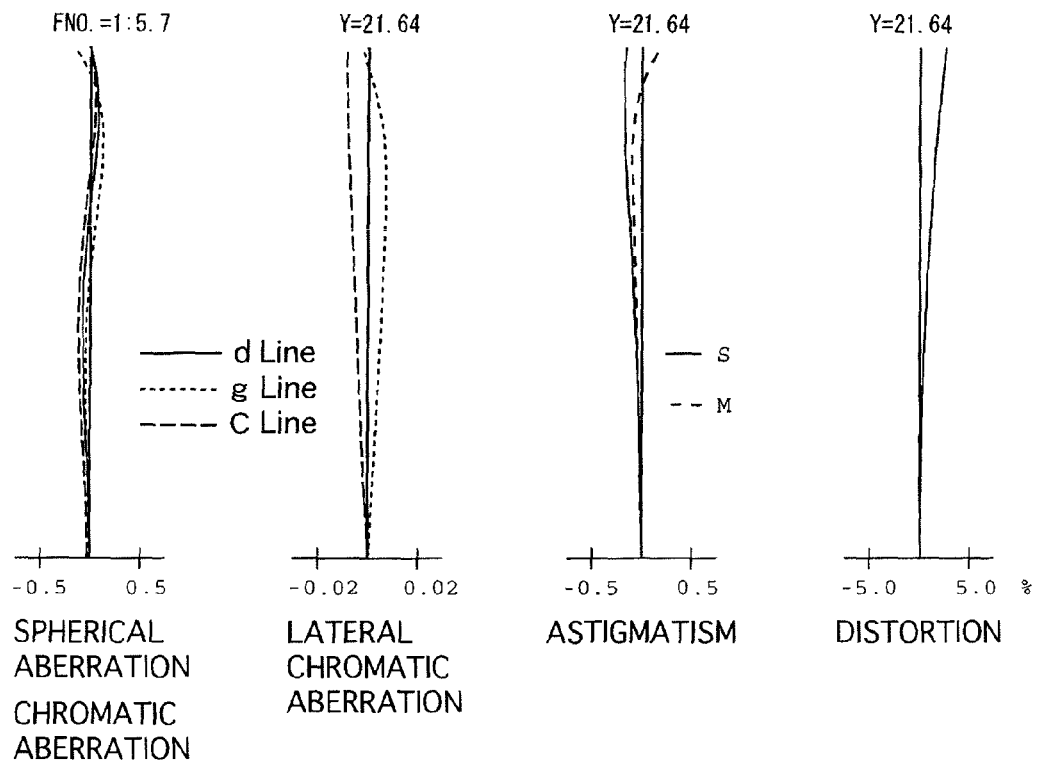
FIGS. 17A, 17B, 17C and 17D show various aberrations that occurred in the lens arrangement shown in FIG. 16.
Figure 18A:
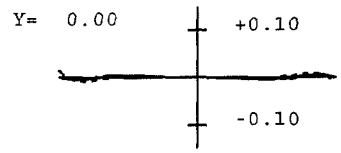
FIGS. 18A, 18B, 18C and 18D show lateral aberrations that occurred in the lens arrangement shown in FIG. 16.
Figure 18B:
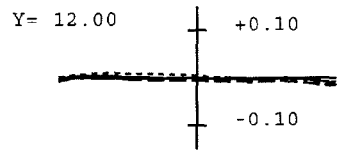
Figure 18C:
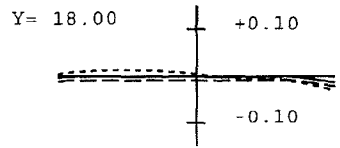
Figure 18D:
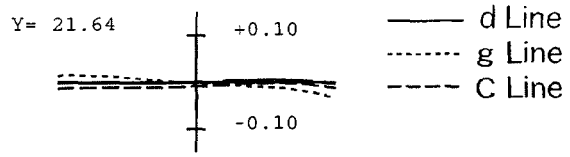

FIGS. 13 through 18D and Tables 9 through 12 show a third numerical embodiment of the zoom lens system according to the present invention. FIG. 13 shows a lens arrangement of the third numerical embodiment of the zoom lens system at the short focal length extremity when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. FIG. 16 shows a lens arrangement of the third numerical embodiment of the zoom lens system at the long focal length extremity when focused on an object at infinity. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 9 shows the lens surface data, Table 10 shows various lens-system data, Table 11 shows the aspherical surface data, and Table 12 shows the lens group data of the zoom lens system.

The fundamental lens arrangement of the third numerical embodiment is the same as those of the first and second numerical embodiments.

TABLE 9

LENS SURFACE DATA

| Surf. No. | R | d | N (d) | ν (d) |
|---|---|---|---|---|
| 1 | 317.915 | 1.500 | 1.84666 | 23.8 |
| 2 | 114.678 | 4.820 | 1.72916 | 54.7 |
| 3 | −779.948 | 0.100 | | |
| 4 | 44.790 | 4.440 | 1.78800 | 47.4 |
| 5 | 60.024 | d5 | | |
| 6* | 61.391 | 0.400 | 1.52972 | 42.7 |
| 7 | 61.391 | 1.100 | 1.88300 | 40.8 |
| 8 | 15.081 | 6.130 | | |
| 9 | −51.515 | 0.820 | 1.72916 | 54.7 |
| 10 | 48.231 | 0.490 | | |
| 11 | 29.500 | 4.410 | 1.76182 | 26.5 |
| 12 | −32.699 | 0.610 | | |
| 13 | −23.744 | 0.800 | 1.88300 | 40.8 |
| 14 | −102.204 | d14 | | |
| 15 (Diaphragm) | ∞ | 3.660 | | |
| 16 | 53.039 | 3.310 | 1.61800 | 63.4 |
| 17 | −52.837 | 0.100 | | |
| 18 | 25.420 | 1.000 | 1.80518 | 25.4 |
| 19 | 14.919 | 5.780 | 1.49700 | 81.6 |
| 20 | −115.174 | d20 | | |
| 21 | −52.243 | 2.250 | 1.76200 | 40.1 |
| 22 | 19.185 | 2.920 | 1.84666 | 23.8 |
| 23 | 124.090 | d23 | | |
| 24* | 154.222 | 5.850 | 1.61800 | 63.4 |
| 25* | −27.944 | 0.100 | | |
| 26 | −100.959 | 1.000 | 1.60342 | 38.0 |
| 27 | 16.991 | 7.500 | 1.51633 | 64.1 |
| 28 | 194.847 | — | | |

The asterisk (*) designates an aspherical surface which is rotationally symmetrical with respect to the optical axis.

TABLE 10

ZOOM LENS SYSTEM DATA
Zoom Ratio 3.55

| | Short Focal Length Extremity | Intermediate Focal Length | Long Focal Length Extremity |
|---|---|---|---|
| FNO. | 3.6 | 4.6 | 5.7 |
| f | 28.82 | 54.96 | 102.34 |
| W | 38.0 | 21.1 | 11.6 |
| Y | 21.64 | 21.64 | 21.64 |

TABLE 10-continued

ZOOM LENS SYSTEM DATA
Zoom Ratio 3.55

| | Short Focal Length Extremity | Intermediate Focal Length | Long Focal Length Extremity |
|---|---|---|---|
| fB | 43.23 | 58.61 | 78.09 |
| L | 138.03 | 156.13 | 189.14 |
| d5 | 3.157 | 17.720 | 37.355 |
| d14 | 19.652 | 7.807 | 1.700 |
| d20 | 1.500 | 7.612 | 11.179 |
| d23 | 11.402 | 5.289 | 1.723 |

TABLE 11

ASPHERICAL SURFACE DATA

| Surf. No. | K | A4 | A6 | A8 | A10 |
|---|---|---|---|---|---|
| 6 | 0.000 | 0.8748E−05 | 0.3368E−08 | −0.2702E−10 | 0.2669E−12 |
| 24 | 0.000 | −0.6024E−05 | −0.2658E−07 | 0.6928E−09 | −0.3893E−12 |
| 25 | 0.000 | 0.9253E−05 | −0.1513E−08 | 0.2079E−09 | 0.1394E−11 |

TABLE 12

LENS GROUP DATA

| Lens Group | 1$^{st}$ Surface | Focal Length |
|---|---|---|
| 1 | 1 | 130.61 |
| 2 | 6 | −18.48 |
| 3 | 16 | 26.37 |
| 4 | 21 | −58.31 |
| 5 | 24 | 79.51 |

Numerical Embodiment 4

Figure 19:
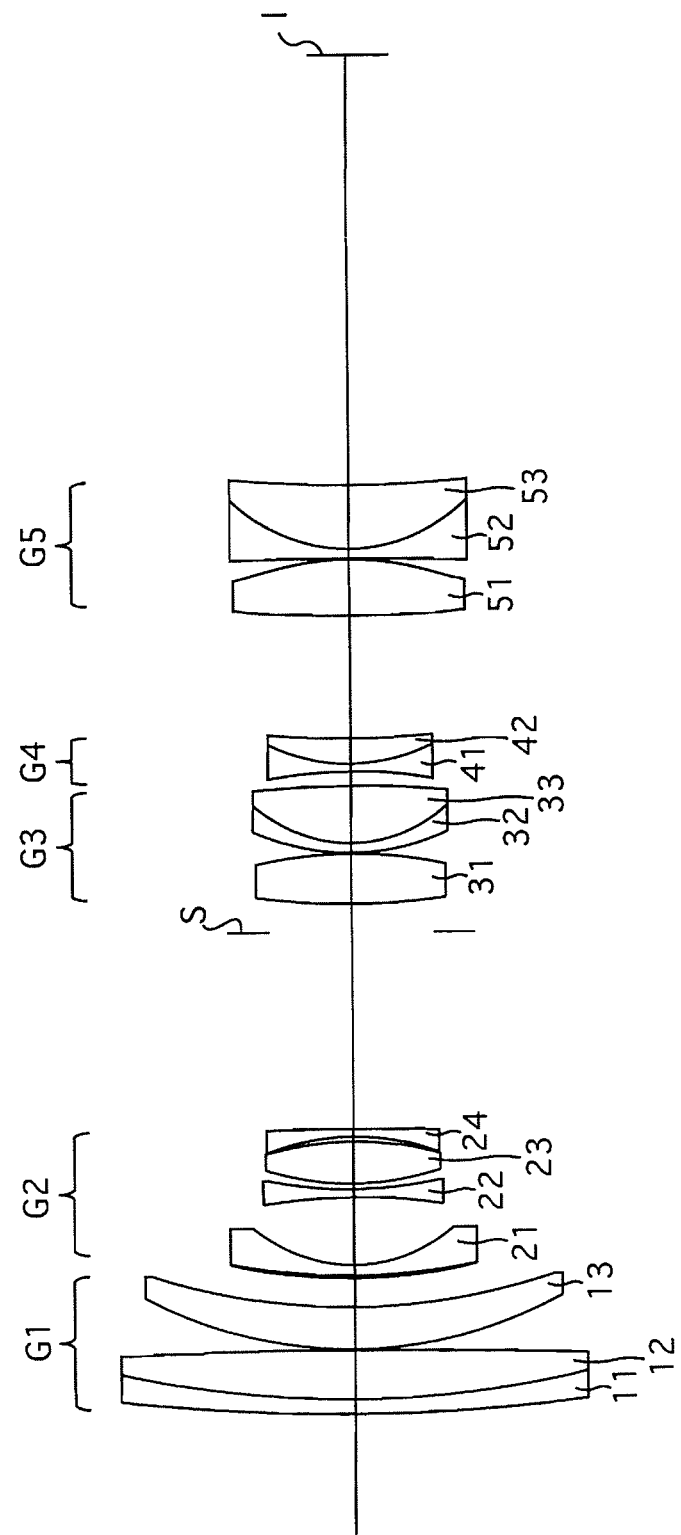
FIG. 19 shows a lens arrangement of a fourth numerical embodiment of a zoom lens system, according to the present invention, at the short focal length extremity when focused on an object at infinity.
Figure 22:
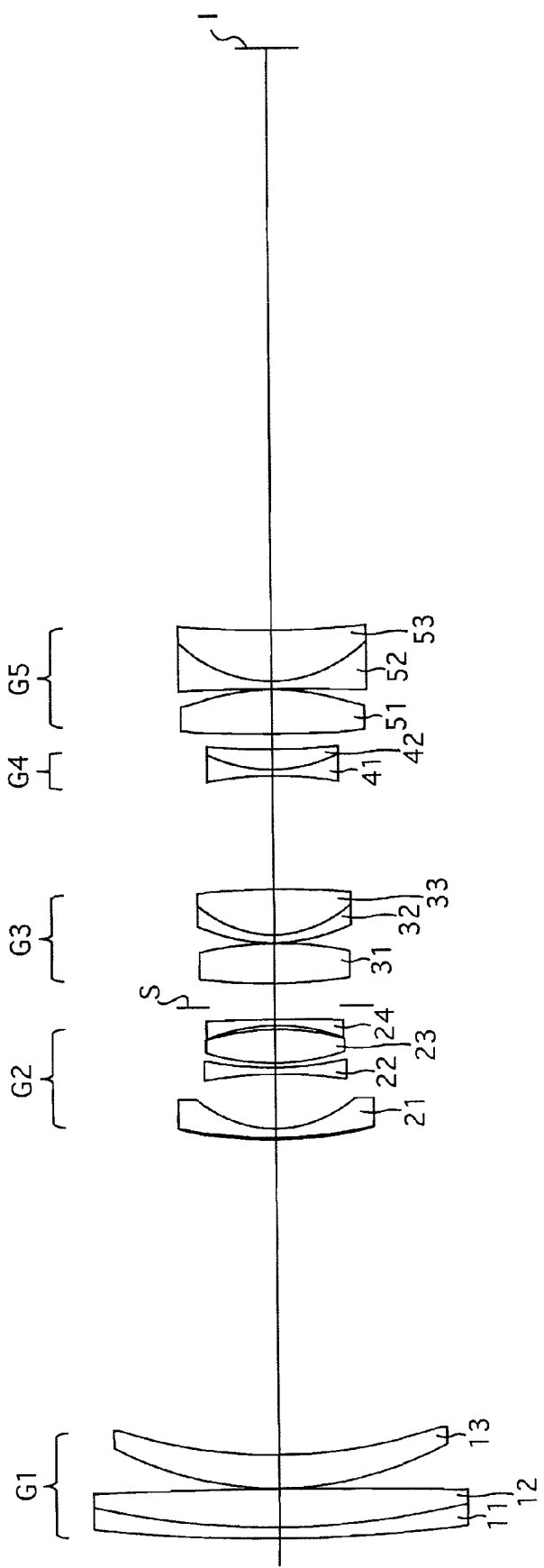
FIG. 22 shows a lens arrangement of the fourth numerical embodiment of the zoom lens system at the long focal length extremity when focused on an object at infinity.

FIGS. 19 through 24D and Tables 13 through 16 show a fourth numerical embodiment of the zoom lens system according to the present invention. FIG. 19 shows a lens arrangement of the fourth numerical embodiment of the zoom lens system at the short focal length extremity when focused on an object at infinity. FIGS. 20A, 20B, 20C and 20D show various aberrations that occurred in the lens arrangement shown in FIG. 19. FIGS. 21A, 21B, 21C and 21D show lateral aberrations that occurred in the lens arrangement shown in FIG. 19. FIG. 22 shows a lens arrangement of the fourth numerical embodiment of the zoom lens system at the long focal length extremity when focused on an object at infinity. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. Table 13 shows the lens surface data, Table 14 shows various lens-system data, Table 15 shows the aspherical surface data, and Table 16 shows the lens group data of the zoom lens system.

The fundamental lens arrangement of the fourth numerical embodiment is the same as those of the first through third numerical embodiments.

TABLE 13

LENS SURFACE DATA

| Surf. No. | R | d | N (d) | ν (d) |
|---|---|---|---|---|
| 1 | 214.489 | 1.500 | 1.84666 | 23.8 |
| 2 | 109.074 | 5.010 | 1.59522 | 67.7 |
| 3 | −742.721 | 0.100 | | |
| 4 | 46.196 | 4.390 | 1.58267 | 46.4 |
| 5 | 68.860 | d5 | | |
| 6* | 66.225 | 0.250 | 1.52972 | 42.7 |
| 7 | 66.224 | 1.100 | 1.91082 | 35.2 |
| 8 | 16.397 | 7.020 | | |
| 9 | −61.511 | 0.820 | 1.74100 | 52.7 |
| 10 | 45.418 | 0.590 | | |
| 11 | 30.795 | 4.340 | 1.80518 | 25.4 |
| 12 | −33.985 | 0.510 | | |
| 13 | −25.592 | 0.800 | 1.88300 | 40.8 |
| 14 | −240.507 | d14 | | |
| 15 (Diaphragm) | ∞ | 2.920 | | |
| 16 | 76.632 | 5.170 | 1.65160 | 58.5 |
| 17 | −47.417 | 0.100 | | |
| 18 | 25.212 | 1.000 | 1.80518 | 25.4 |
| 19 | 15.500 | 5.890 | 1.49700 | 81.6 |
| 20 | −109.942 | d20 | | |
| 21 | −49.359 | 0.800 | 1.72342 | 38.0 |
| 22 | 20.047 | 2.640 | 1.84666 | 23.8 |
| 23 | 106.890 | d23 | | |
| 24* | 199.948 | 5.760 | 1.61881 | 63.8 |
| 25* | −29.536 | 0.100 | | |
| 26 | −339.110 | 1.000 | 1.66998 | 39.3 |
| 27 | 17.914 | 6.610 | 1.53775 | 74.7 |
| 28 | 135.508 | — | | |

The asterisk (*) designates an aspherical surface which is rotationally symmetrical with respect to the optical axis.

TABLE 14

ZOOM LENS SYSTEM DATA
Zoom Ratio 3.56

| | Short Focal Length Extremity | Intermediate Focal Length | Long Focal Length Extremity |
|---|---|---|---|
| FNO. | 3.6 | 4.6 | 5.7 |
| f | 28.78 | 55.00 | 102.35 |
| W | 38.0 | 20.9 | 11.5 |
| Y | 21.64 | 21.64 | 21.64 |
| fB | 44.00 | 58.48 | 75.13 |
| L | 139.84 | 157.09 | 192.79 |
| d5 | 3.000 | 16.932 | 40.962 |
| d14 | 20.226 | 7.624 | 1.700 |
| d20 | 1.500 | 9.460 | 14.621 |
| d23 | 12.694 | 6.174 | 1.964 |

TABLE 15

ASPHERICAL SURFACE DATA

| Surf. No. | K | A4 | A6 | A8 | A10 |
|---|---|---|---|---|---|
| 6 | 0.000 | 0.6368E−05 | 0.2884E−08 | −0.1494E−10 | 0.1467E−12 |
| 24 | 0.000 | −0.4098E−05 | −0.1380E−07 | 0.7233E−09 | −0.5479E−12 |
| 25 | 0.000 | 0.9750E−05 | 0.6033E−08 | 0.2891E−09 | 0.1235E−11 |

TABLE 16

LENS GROUP DATA

| Lens Group | 1st Surface | Focal Length |
|---|---|---|
| 1 | 1 | 144.70 |
| 2 | 6 | −18.84 |
| 3 | 16 | 26.44 |

TABLE 16-continued

LENS GROUP DATA

| Lens Group | 1st Surface | Focal Length |
|---|---|---|
| 4 | 21 | −60.47 |
| 5 | 24 | 90.35 |

Numerical Embodiment 5

Figure 25:
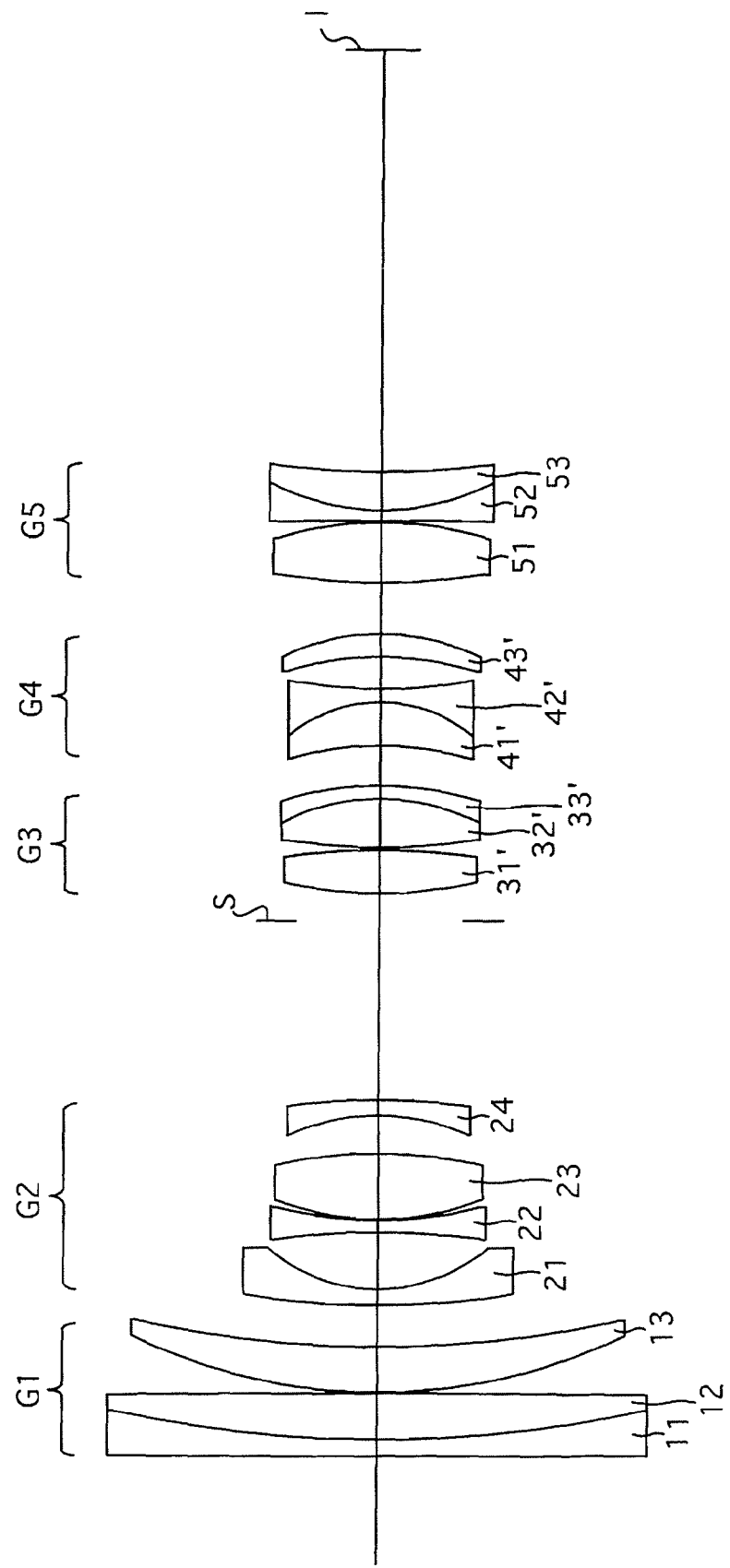
FIG. 25 shows a lens arrangement of a fifth numerical embodiment of a zoom lens system, according to the present invention, at the short focal length extremity when focused on an object at infinity.
Figures 26A, 26B, 26C, 26D:
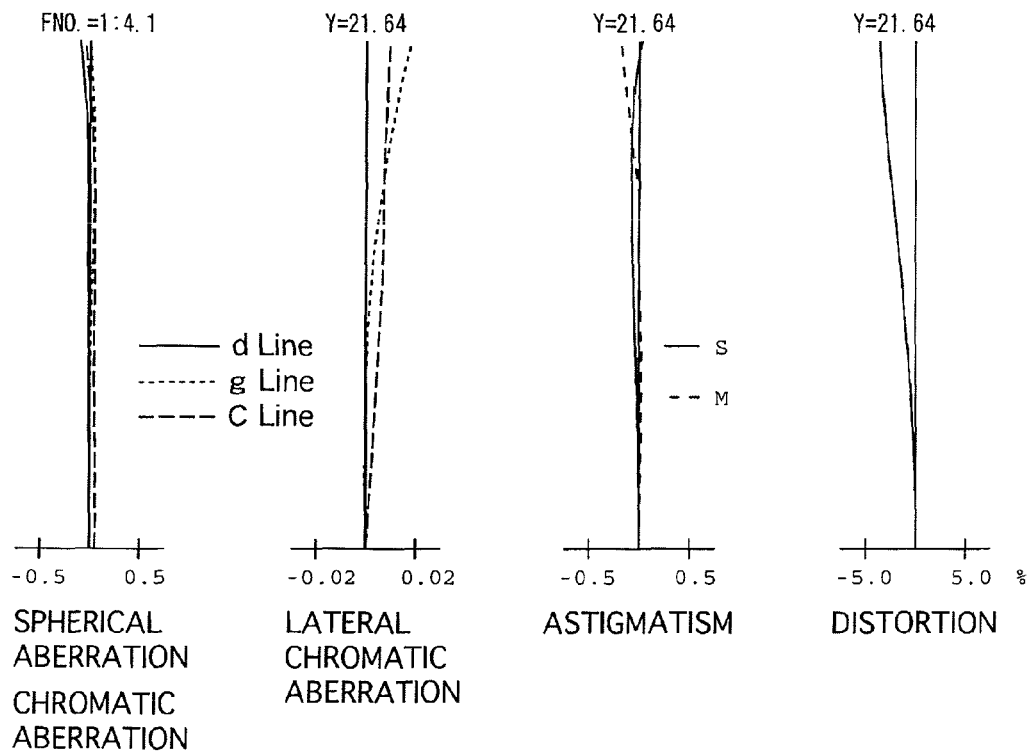
FIGS. 26A, 26B, 26C and 26D show various aberrations that occurred in the lens arrangement shown in FIG. 25.
Figure 27A:
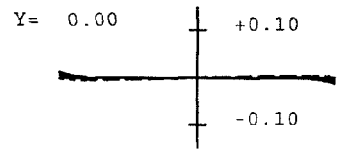
FIGS. 27A, 27B, 27C and 27D show lateral aberrations that occurred in the lens arrangement shown in FIG. 25.
Figure 27B:
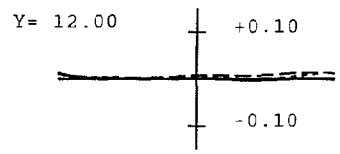
Figure 27C:
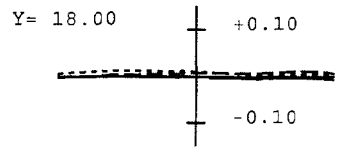
Figure 27D:
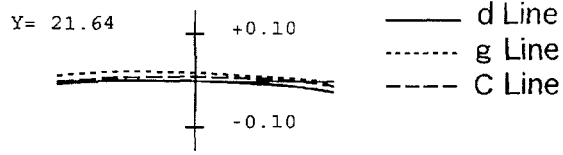
Figure 28:
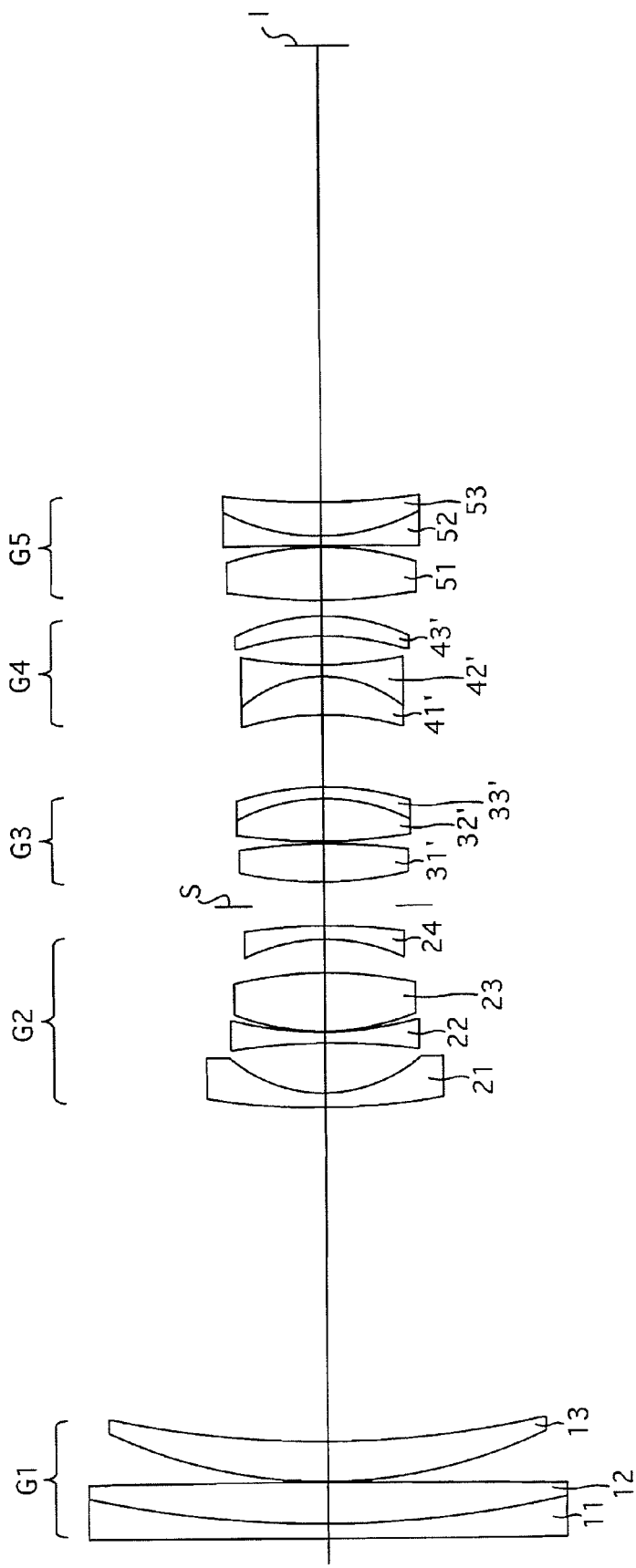
FIG. 28 shows a lens arrangement of the fifth numerical embodiment of the zoom lens system at the long focal length extremity when focused on an object at infinity.

FIGS. 25 through 30D and Tables 17 through 20 show a fifth numerical embodiment of the zoom lens system according to the present invention. FIG. 25 shows a lens arrangement of the fifth numerical embodiment of the zoom lens system at the short focal length extremity when focused on an object at infinity. FIGS. 26A, 26B, 26C and 26D show various aberrations that occurred in the lens arrangement shown in FIG. 25. FIGS. 27A, 27B, 27C and 27D show lateral aberrations that occurred in the lens arrangement shown in FIG. 25. FIG. 28 shows a lens arrangement of the fifth numerical embodiment of the zoom lens system at the long focal length extremity when focused on an object at infinity. FIGS. 29A, 29B, 29C and 29D show various aberrations that occurred in the lens arrangement shown in FIG. 28. FIGS. 30A, 30B, 30C and 30D show lateral aberrations that occurred in the lens arrangement shown in FIG. 28. Table 17 shows the lens surface data, Table 18 shows various lens-system data, Table 19 shows the aspherical surface data, and Table 20 shows the lens group data of the zoom lens system.

The fundamental lens arrangement of the fifth numerical embodiment is the same as those of the first through fourth numerical embodiments except for the following features:

(1) An aspherical surface is formed on the object-side surface of the negative meniscus lens element 21 of the second lens group G2 (i.e., the negative meniscus lens element 21 is not a hybrid lens).

(2) The third lens group G3 is configured of a biconvex positive lens element 31', a biconvex positive lens element 32', and a negative meniscus lens element 33' having a convex surface on the image side, in that order from the object side. An aspherical surface is formed on the surface on the object side of the biconvex positive lens element 32'. The biconvex positive lens element 32' and the negative meniscus lens element 33' are cemented to each other.

(3) The fourth lens group G4 is configured of a positive meniscus lens element 41' having a convex surface on the image side, a biconcave negative lens element 42', and a positive meniscus lens element 43' having a convex surface on the image side, in that order from the object side. The positive meniscus lens element 41' and the biconcave negative lens element 42' are cemented to each other.

(4) An aspherical surface is formed on only the object side (not on both sides) of the biconvex positive lens element 51 of the fifth lens group G5.

TABLE 17

LENS SURFACE DATA

| Surf. No. | R | d | N (d) | ν (d) |
|---|---|---|---|---|
| 1 | 28758.804 | 1.960 | 1.84666 | 23.8 |
| 2 | 146.807 | 5.330 | 1.74100 | 52.7 |
| 3 | −2188.728 | 0.100 | | |
| 4 | 66.241 | 5.210 | 1.81600 | 46.6 |
| 5 | 132.631 | d5 | | |
| 6* | 125.752 | 1.800 | 1.72916 | 54.7 |
| 7 | 19.796 | 6.460 | | |
| 8 | −88.906 | 1.400 | 1.83400 | 37.2 |
| 9 | 49.851 | 0.100 | | |
| 10 | 33.761 | 7.500 | 1.80000 | 29.9 |
| 11 | −53.342 | 4.310 | | |
| 12 | −24.898 | 1.740 | 1.61272 | 58.7 |
| 13 | −75.917 | d13 | | |
| 14 (Diaphragm) | ∞ | 3.150 | | |
| 15 | 51.946 | 4.900 | 1.60300 | 65.5 |
| 16 | −77.894 | 0.300 | | |
| 17* | 71.127 | 5.520 | 1.52501 | 70.4 |
| 18 | −25.145 | 1.500 | 1.80518 | 25.4 |
| 19 | −38.032 | d19 | | |
| 20 | −36.761 | 4.990 | 1.72000 | 50.2 |
| 21 | −16.613 | 1.500 | 1.65160 | 58.5 |
| 22 | 58.421 | 3.690 | | |
| 23 | −37.199 | 2.620 | 1.59551 | 39.2 |
| 24 | −26.318 | d24 | | |
| 25* | 65.515 | 6.840 | 1.49700 | 81.6 |
| 26 | −41.366 | 0.200 | | |
| 27 | −558.125 | 1.200 | 1.59551 | 39.2 |
| 28 | 28.478 | 4.390 | 1.49700 | 81.6 |
| 29 | 103.934 | — | | |

The asterisk (*) designates an aspherical surface which is rotationally symmetrical with respect to the optical axis.

TABLE 18

ZOOM LENS SYSTEM DATA
Zoom Ratio 2.19

| | Short Focal Length Extremity | Intermediate Focal Length | Long Focal Length Extremity |
|---|---|---|---|
| FNO. | 4.1 | 4.1 | 4.1 |
| f | 36.11 | 51.17 | 79.07 |
| W | 31.9 | 22.9 | 15.0 |
| Y | 21.64 | 21.64 | 21.64 |
| fB | 48.06 | 55.95 | 58.90 |
| L | 160.34 | 166.92 | 192.65 |
| d5 | 4.760 | 15.301 | 43.289 |
| d13 | 20.427 | 9.601 | 2.513 |
| d19 | 4.552 | 6.691 | 9.230 |
| d24 | 5.828 | 2.666 | 2.000 |

TABLE 19

ASPHERICAL SURFACE DATA

| Surf. No. | K | A4 | A6 | A8 | A10 |
|---|---|---|---|---|---|
| 6 | 0.000 | 0.4024E−05 | −0.1018E−08 | 0.1014E−10 | −0.9418E−14 |
| 17 | 0.000 | −0.5414E−05 | −0.1874E−07 | 0.1547E−09 | −0.6930E−12 |
| 25 | 0.000 | −0.7578E−05 | 0.1095E−07 | −0.7537E−10 | 0.2086E−12 |

TABLE 20

LENS GROUP DATA

| Lens Group | 1$^{st}$ Surface | Focal Length |
|---|---|---|
| 1 | 1 | 165.56 |
| 2 | 6 | −27.83 |
| 3 | 15 | 28.96 |
| 4 | 20 | −56.43 |
| 5 | 25 | 94.74 |

The numerical values of each condition for each numerical embodiment are shown in Table 21.

TABLE 21

| | Embod. 1 | Embod. 2 | Embod. 3 |
|---|---|---|---|
| Cond. (1) | 0.53 | 0.60 | 0.66 |
| Cond. (2) & (2') | 0.52 | 0.46 | 0.43 |
| Cond. (3) | −1.50 | −1.34 | −1.77 |
| Cond. (4) | −4.14 | −5.56 | −5.13 |
| Cond. (5) & (5') | 0.57 | 0.62 | 0.62 |
| Cond. (6) | −0.13 | 0.10 | −0.32 |

| | Embod. 4 | Embod. 5 |
|---|---|---|
| Cond. (1) | 0.66 | 0.69 |
| Cond. (2) & (2') | 0.42 | 0.66 |
| Cond. (3) | −1.19 | −1.16 |
| Cond. (4) | −7.38 | −3.46 |
| Cond. (5) & (5') | 0.63 | 0.68 |
| Cond. (6) | 0.43 | 0.69 |

As can be understood from Table 21, the first through fifth numerical embodiments satisfy conditions (1) through (6). Furthermore, as can be understood from the various aberration diagrams and lateral aberration diagrams, the various aberrations and lateral aberrations are favorably corrected.

Even if a lens element or lens group having effectively no refractive power were to be added to the zoom lens system included in the scope of the claims of the present invention, such a zoom lens system would still remain within the technical scope of the present invention (and would not be excluded from the technical scope of the present invention).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive third lens group, a negative fourth lens group, and a positive fifth lens group, in that order from the object side,
    wherein, during zooming from the short focal length extremity to the long focal length extremity, at least said first lens group, said third lens group and said fifth lens group move in an optical axis direction thereof,
    wherein said fifth lens group includes a plurality of lens elements, wherein a surface closest to the image side of said zoom lens system is a concave surface facing the image side, and wherein the following condition (1) is satisfied:

$$0.52<(m345t/m345w)/(ft/fw)<0.70 \quad (1),$$

wherein m345w designates the combined lateral magnification of said third lens group, said fourth lens group and said fifth lens group at the short focal length extremity when focused on an object at infinity, m345t designates the combined lateral magnification of said third lens group, said fourth lens group and said fifth lens group at the long focal length extremity when focused on an object at infinity, fw designates the focal length of said zoom lens system at the short focal length extremity, and ft designates the focal length of said zoom lens system at the long focal length extremity.

2. The zoom lens system according to claim 1, wherein the following condition (2) is satisfied:

$$0.4<(m2t/m2w)/(ft/fw) \quad (2),$$

wherein m2w designates the lateral magnification of said second lens group at the short focal length extremity when focused on an object at infinity, m2t designates the lateral magnification of said second lens group at the long focal length extremity when focused on an object at infinity, fw designates the focal length of said zoom lens system at the short focal length extremity, and ft designates the focal length of said zoom lens system at the long focal length extremity.

3. The zoom lens system according to claim 1, wherein said fourth lens group comprises a plurality of lens elements.

4. The zoom lens system according to claim 1, wherein said fifth lens group comprises a positive single lens element, and a cemented lens formed of a negative single lens element and a positive single lens element, in that order from the object side.

5. The zoom lens system according to claim 4, wherein the following condition (3) is satisfied:

$$-2.0<(Rsi+Rdo)/(Rsi-Rdo)<-1.0 \quad (3),$$

wherein

Rsi designates the radius of curvature of the surface on the image side of the positive single lens element that is provided closest to the object side within said fifth lens group, and Rdo designates the radius of curvature of the surface on the object side of the cemented lens that is provided within said fifth lens group.

6. The zoom lens system according to claim 4, wherein the following condition (4) is satisfied:

$$(np-nn)/Rb \times 1000<-3.0 \quad (4),$$

wherein np designates the refractive index at the d-line of the positive single lens element of said cemented lens that is provided within said fifth lens group, nn designates the refractive index at the d-line of the negative single lens element of said cemented lens that is provided within said fifth lens group, and Rb designates the radius of curvature of a cemented surface of said cemented lens that is provided within said fifth lens group.

7. The zoom lens system according to claim 1, wherein a surface closest to the image side of said fifth lens group is a concave surface facing the image side.

8. A zoom lens system comprising a positive first lens group, a negative second lens group, a positive third lens group, a negative fourth lens group, and a positive fifth lens group, in that order from the object side, wherein, during zooming from the short focal length extremity to the long focal length extremity, at least said first lens group, said third lens group and said fifth lens group move in an optical axis direction thereof, wherein a surface closest to the image side of said zoom lens system is a concave surface facing the image side, and wherein the following conditions (1) and (2) are satisfied:

$$0.52<(m345t/m345w)/(ft/fw)<0.70 \quad (1), \text{ and}$$

$$0.4<(m2t/m2w)/(ft/fw) \quad (2),$$

wherein m345w designates the combined lateral magnification of said third lens group, said fourth lens group and said fifth lens group at the short focal length extremity when focused on an object at infinity, m345t designates the combined lateral magnification of said third lens group, said fourth lens group and said fifth lens group at the long focal length extremity when focused on an object at infinity, m2w designates the lateral magnification of said second lens group at the short focal length extremity when focused on an object at infinity, m2t designates the lateral magnification of said second lens group at the long focal length extremity when focused on an object at infinity, fw designates the focal length of said zoom lens system at the short focal length extremity, and ft designates the focal length of said zoom lens system at the long focal length extremity.

9. The zoom lens system according to claim 8, wherein said fourth lens group comprises a plurality of lens elements.

10. The zoom lens system according to claim 8, wherein said fifth lens group comprises a positive single lens element, and a cemented lens formed of a negative single lens element and a positive single lens element, in that order from the object side.

11. The zoom lens system according to claim 10, wherein the following condition (3) is satisfied:

$$-2.0<(Rsi+Rdo)/(Rsi-Rdo)<-1.0 \quad (3),$$

wherein

Rsi designates the radius of curvature of the surface on the image side of the positive single lens element that is provided closest to the object side within said fifth lens group, and Rdo designates the radius of curvature of the surface on the object side of the cemented lens that is provided within said fifth lens group.

12. The zoom lens system according to claim 10, wherein the following condition (4) is satisfied:

$$(np-nn)/Rb \times 1000<-3.0 \quad (4),$$

wherein np designates the refractive index at the d-line of the positive single lens element of said cemented lens that is provided within said fifth lens group, nn designates the refractive index at the d-line of the negative single lens element of said cemented lens that is provided within said fifth lens group, and Rb designates the radius of curvature of a cemented surface of said cemented lens that is provided within said fifth lens group.

13. The zoom lens system according to claim 8, wherein a surface closest to the image side of said fifth lens group is a concave surface facing the image side.

\* \* \* \* \*